(12) United States Patent
West et al.

(10) Patent No.: US 6,971,121 B2
(45) Date of Patent: Nov. 29, 2005

(54) COMPOSITE BUFFERING

(75) Inventors: John Eric West, Roswell, GA (US);
Arturo A. Rodriguez, Norcross, GA (US)

(73) Assignee: Scientific-Atlanta, Inc., Lawrenceville, GA (US)

(*) Notice: Subject to any disclaimer, the term of this patent is extended or adjusted under 35 U.S.C. 154(b) by 546 days.

(21) Appl. No.: 10/102,043

(22) Filed: Mar. 20, 2002

(65) Prior Publication Data

US 2003/0110514 A1 Jun. 12, 2003

Related U.S. Application Data

(63) Continuation-in-part of application No. 10/010,270, filed on Dec. 6, 2001, and a continuation-in-part of application No. 10/008,439, filed on Dec. 6, 2001, and a continuation-in-part of application No. 10/008,624, filed on Dec. 6, 2001.

(51) Int. Cl.[7] .............................................. H04N 7/16
(52) U.S. Cl. ..................... 725/142; 725/134; 348/731
(58) Field of Search ................................ 725/131, 134, 725/139, 142, 151, 37, 38; 348/563, 564, 348/565, 731; H04N 7/16

(56) References Cited

U.S. PATENT DOCUMENTS

| | | | |
|---|---|---|---|
| 4,706,121 A | 11/1987 | Young | 358/142 |
| 4,908,713 A | 3/1990 | Levine | 358/335 |
| 4,963,994 A | 10/1990 | Levine | 358/335 |
| 5,253,066 A | 10/1993 | Vogel | 358/188 |
| 5,262,856 A * | 11/1993 | Lippman et al. | 375/240.12 |
| 5,293,357 A | 3/1994 | Hallenbeck | 348/734 |
| 5,343,250 A * | 8/1994 | Iwamura | 348/564 |
| 5,371,551 A | 12/1994 | Logan et al. | 348/571 |
| 5,477,262 A | 12/1995 | Banker et al. | 348/7 |
| 5,479,268 A | 12/1995 | Young et al. | 358/335 |
| 5,508,815 A | 4/1996 | Levine | 358/335 |
| 5,568,272 A | 10/1996 | Levine | 386/48 |
| 5,809,204 A | 9/1998 | Young et al. | 386/83 |
| 5,864,639 A * | 1/1999 | Chao | 382/293 |
| 5,900,885 A * | 5/1999 | Stortz | 345/537 |
| 5,915,068 A | 6/1999 | Levine | 386/83 |
| 5,990,975 A * | 11/1999 | Nan et al. | 348/588 |
| RE36,801 E | 8/2000 | Logan et al. | 348/571 |
| 6,118,498 A | 9/2000 | Reitmeier | 348/725 |
| 6,330,252 B1 * | 12/2001 | Shojima | 370/536 |
| 6,334,217 B1 * | 12/2001 | Kim | 725/38 |
| 6,542,203 B1 | 4/2003 | Shadwell et al. | 348/726 |
| 6,803,968 B1 * | 10/2004 | Numata | 348/584 |

OTHER PUBLICATIONS

Scientific-Atlanta, Inc. Pending U.S. Appl. No. 10/010,270, filed Dec. 6, 2001, Title: "Controlling Substantially Constant Buffer Capacity for Personal Video Recording with Consistent User Interface of Available Disk Space," Inventors: Harold J. Plourde, Jr. and Arturo A. Rodriguez.

Scientific-Atlanta, Inc. Pending U.S. Appl. No. 10/008,439, filed Dec. 6, 2001, Title: "Dividing and Managing Time-Shift Buffering Into Program Specific Segments Based on Defined Durations," Inventors: Harold J. Plourde, Jr. and Arturo A. Rodriguez.

(Continued)

*Primary Examiner*—Vivek Srivastava

(57) ABSTRACT

A system is provided for managing and accessing media content received via a plurality of display channels and stored in a plurality of buffers in a storage device. The system associates the plurality of buffers with a composite buffer file.

48 Claims, 25 Drawing Sheets

OTHER PUBLICATIONS

Scientific-Atlanta, Inc. Pending U.S. Appl. No. 10/008,624, filed Dec. 6, 2001, Title: "Converting Time-Shift Buffering for Personal Video Recording into Permanent Recordings," Inventors: Harold J. Plourde, Jr. and Arturo A. Rodriguez.

Scientific-Atlanta, Inc. Pending U.S. Appl. No. 10/034,028, filed Dec. 20, 2001, Title: "Program Position User Interface for Personal Video Recording Time Shift Buffer," Inventors: Dariusz S. Kaminski and Robert O. Banker.

Scientific-Atlanta, Inc. Pending U.S. Appl. No. 10/010,781, filed Dec. 5, 2001, Title: "Application Management and Interface for Cluster Control of Time Shift Buffer," Inventors: Harold J. Plourde, Jr.

Scientific-Atlanta, Inc. Pending U.S. Appl. No. 10/005,628, filed Dec. 5, 2001, Title: "Disk Driver Cluster Management of Time Shift Buffer with File Allocation Table Structure," Inventors: Harold J. Plourde, Jr.

Scientific-Atlanta, Inc. Pending U.S. Appl. No. 10/143,123, filed May 10, 2002, Title: "Channel Buffering and Display Management System for Multi-Tuner Set-Top Box," Inventors: Arturo A. Rodriguez and Ramesh Nallur.

Scientific-Atlanta, Inc. Pending U.S. Appl. No. 10/143,647, filed May 10, 2002, Title: "Managing Time Shift Buffers," Inventors: Dariusz S. Kaminski, Arturo A. Rodriguez, Robert O. Banker and Valerie G. Gutknecht.

Scientific-Atlanta, Inc. Pending U.S. Appl. No. 10/015,349, filed Dec. 11, 2001, Title: "Controlling Personal Video Recording Functions from Interactive Television," Inventors: Mark E. Schutte and Valerie G. Gutknecht.

* cited by examiner

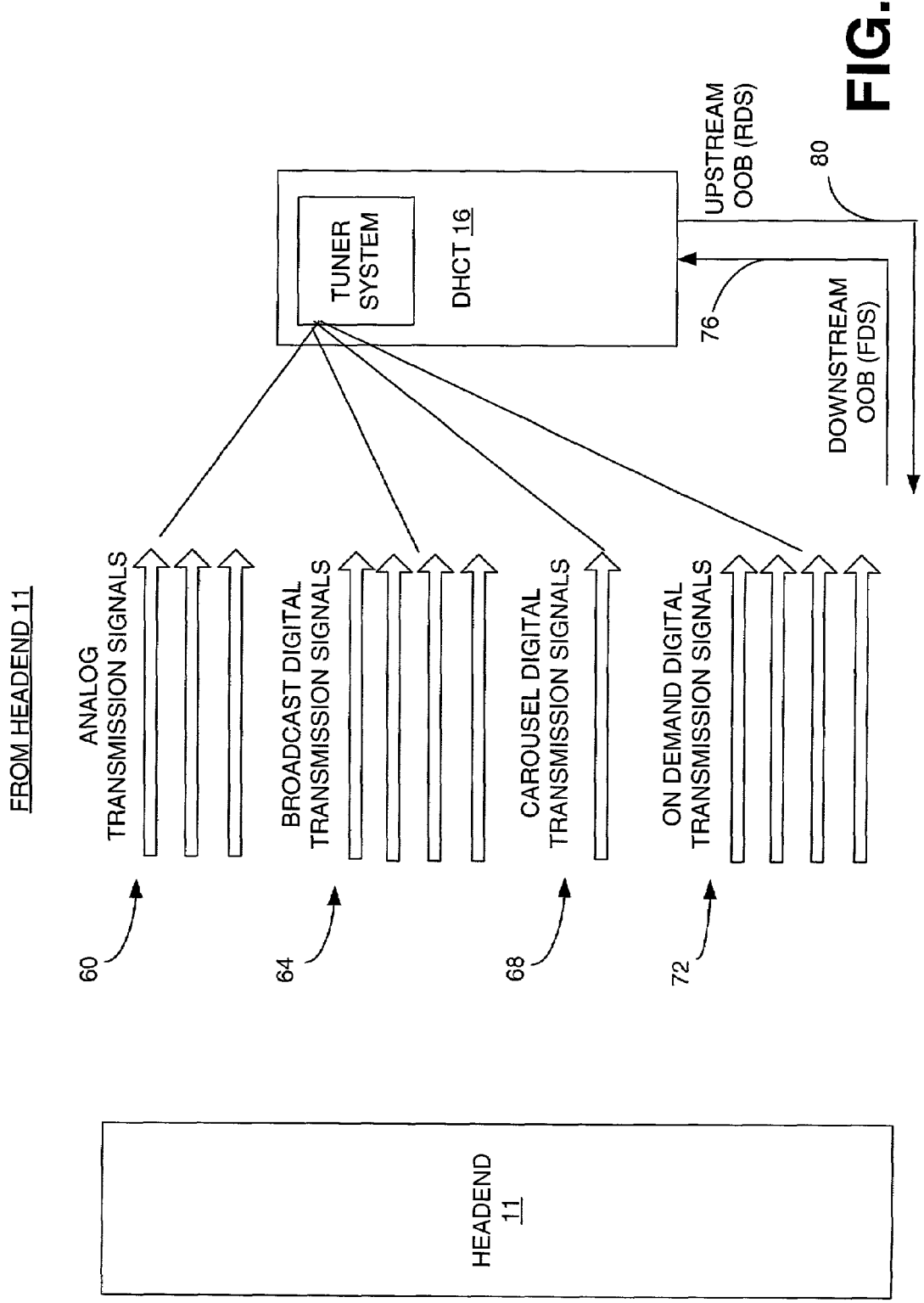

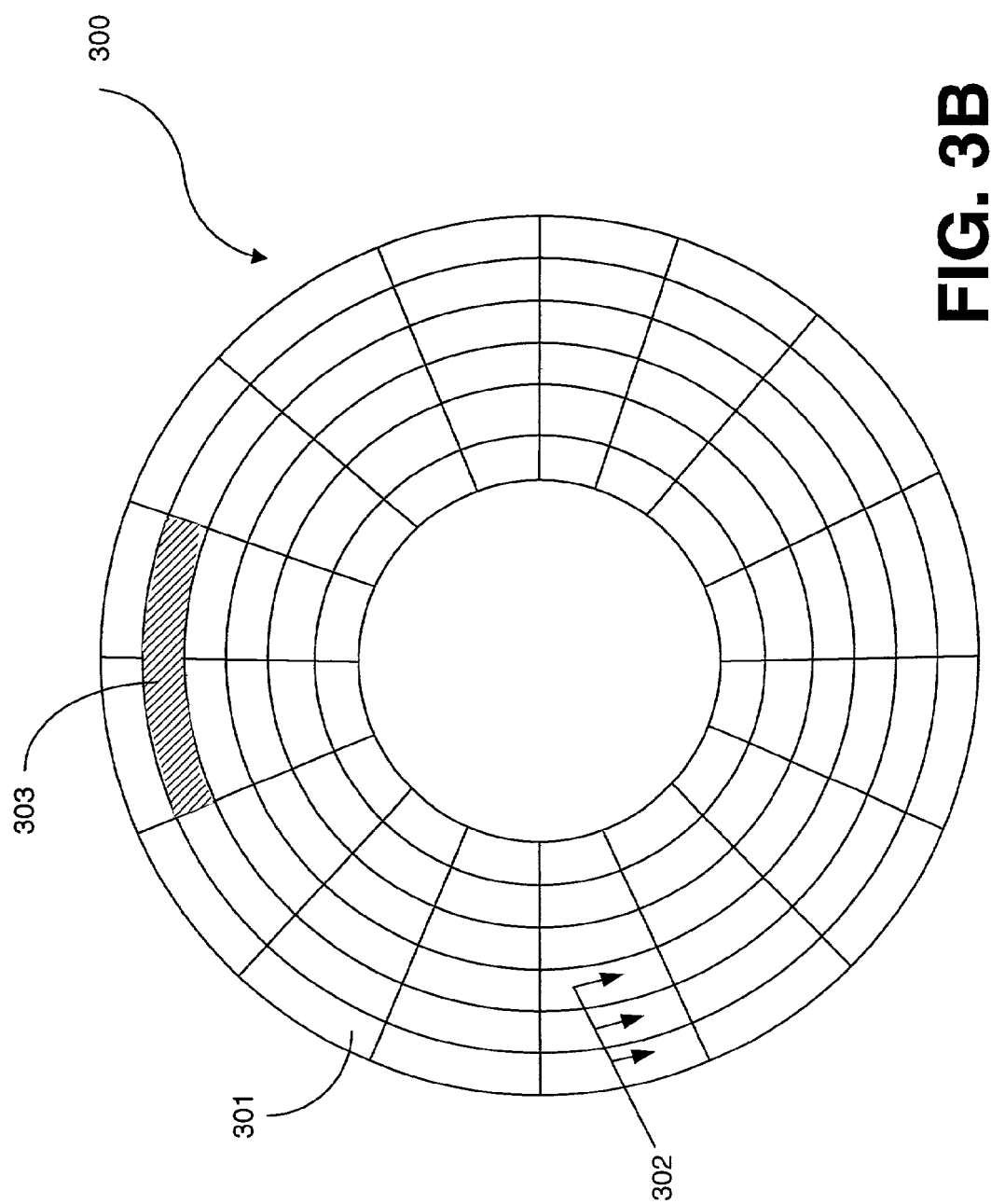

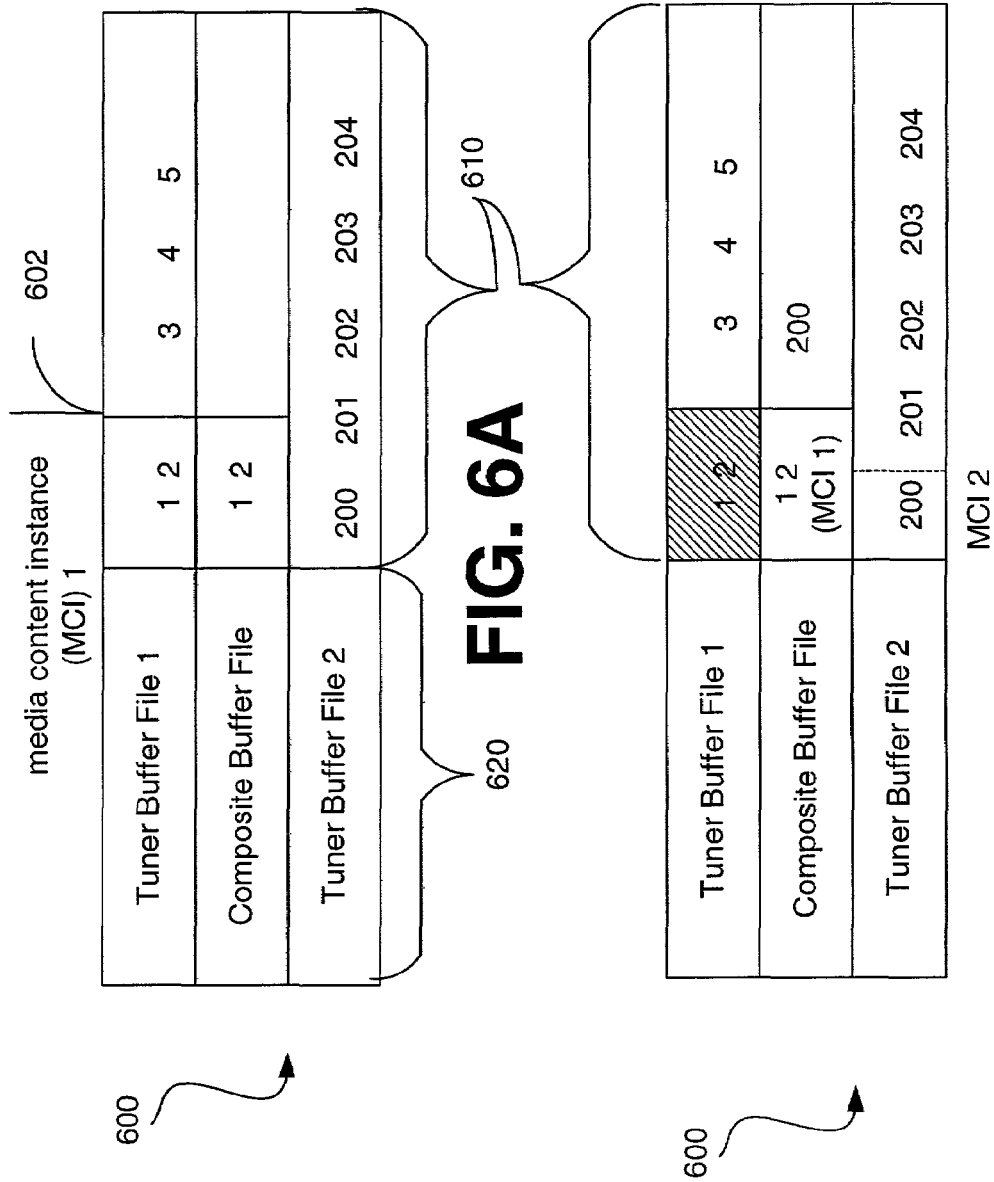

FIG. 6C

| Tuner Buffer File 1 | Composite Buffer File | Tuner Buffer File 2 |
|---|---|---|
| 3 4 5 | 1 2 (MCI 1) | 200 201 202 |
| | 200 201 202 | 203 204 |

MCI 2 — 604

FIG. 6D

| Tuner Buffer File 1 | Composite Buffer File | Tuner Buffer File 2 |
|---|---|---|
| 3 4 5 | 1 2 (MCI 1) | 200 201 202 |
| | 200 201 202 (MCI 2) | 203 204 |

600

| Tuner Buffer File 1 | Composite Buffer File | Tuner Buffer File 2 |
|---|---|---|
| MCI 3 ⌐ 3  4  5 | 1  2  (MCI 1) / 200 201 202 (MCI 2) / 3 | 203  204 |

| Composite Buffer File | 1 2 3 | 4 5 | 6 7 8 9 10 |
|---|---|---|---|
| Tuner Buffer File | 1 2 3 | 4 5 | |
| | media content instance (MCI) 1 | MCI 2 | |

FIG. 7A

| Tuner Buffer File 1 | 1 2 | |
|---|---|---|
| Composite Buffer File | 1 2 | 3 4 5 6 7 8 9 10 |
| Tuner Buffer File 2 | | |
| | media content instance (MCI) 1 | |

| Tuner Buffer File 1 | media content instance (MCI) 1 ← 802 | 3 4 5 |
|---|---|---|
| Composite Buffer File | 1 2 | |
| Tuner Buffer File 2 | 200 201 202 203 204 | |

FIG. 8B

| Tuner Buffer File 1 | 1 2 (MCI 1) | 3 4 5 |
|---|---|---|
| Composite Buffer File | 1 2 (MCI 1) | 200 201 202 |
| Tuner Buffer File 2 | 200 201 202 | 203 204 |

MCI 2 ← 804

FIG. 8C

| Tuner Buffer File 1 | | 3 4 5 | |
|---|---|---|---|
| Composite Buffer File | 1 2 (MCI 1) | 200 201 202 (MCI 2) | 3 |
| Tuner Buffer File 2 | 200 201 202 (MCI 2) | 203 204 | |

MCI 3

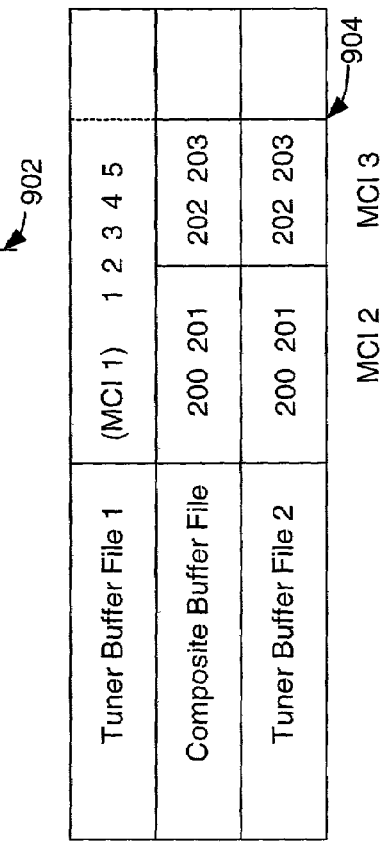

COMPOSITE BUFFERING

CROSS-REFERENCE TO RELATED APPLICATION

This application is a continuation-in-part of copending U.S. utility applications entitled, "CONTROLLING SUBSTANTIALLY CONSTANT BUFFER CAPACITY FOR PERSONAL VIDEO RECORDING WITH CONSISTENT USER INTERFACE OF AVAILABLE DISK SPACE," having Ser. No. 10/010,270, filed Dec. 6, 2001, "DIVIDING AND MANAGING TIME-SHIFT BUFFERING INTO PROGRAM SPECIFIC SEGMENTS BASED ON DEFINED DURATIONS," having Ser. No. 10/008,439, filed Dec. 6, 2001, and "CONVERTING TIME-SHIFT BUFFERING FOR PERSONAL VIDEO RECORDING INTO PERMANENT RECORDINGS," having Ser. No. 10/008,624, filed Dec. 6, 2001, all of which are entirely incorporated herein by reference.

TECHNICAL FIELD

The present invention is generally related to television systems, and, more particularly, is related to buffering mechanisms for personal video recording.

BACKGROUND OF THE INVENTION

With recent advances in digital transmission technology, subscriber television systems are now capable of providing much more than the traditional analog broadcast video. In implementing enhanced programming, the home communication terminal device ("HCT"), otherwise known as the set-top box, has become an important computing device for accessing media content services (and media content, such as movies, TV shows, web content, etc., within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Some of the software executed by a DHCT may be downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

DHCTs are typically capable of providing users with a very large number and variety of media content choices. As the number of available media content choices increases, viewing conflicts arise whereby the user must choose between watching two or more media content instances (e.g., discrete, individual instances of media content such as, for a non-limiting example, a particular television show episode or "program"), all of which the user would like to view. Further, because of the large number of viewing choices, the user may miss viewing opportunities. Buffering of media content instances in memory, or more recently, in storage devices (e.g., hard disk drives, CD ROM, etc.) coupled to the DHCT, has provided some relief from the conflict in viewing choices while providing personal video recording functionality. However, much of these buffered media content instances are irretrievably lost as a user scans or "surfs" through multiple display channels. Therefore, there exists needs to improve access to surfed media content and to more efficiently manage multiple buffers.

Thus, heretofore unaddressed needs exists in the industry to address the aforementioned deficiencies and inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1B shows a block diagram of the transmission signals supported by the STS of FIG. 1A, and input into a digital home communication terminal (DHCT) from a headend, in accordance with one embodiment of the invention.

FIG. 3B is a schematic diagram of a non-limiting example hard disk and hard disk elements located within the storage device coupled to the DHCT depicted in FIG. 3A.

FIGS. 6A–6E are block diagrams of portion of a non-limiting example FAT, illustrating the file sharing and designation mechanisms for composite buffering in a two tuner implementation, in accordance with one embodiment of the invention.

FIGS. 7A and 7B are block diagrams of portions of a non-limiting example FAT, illustrating the composite buffering mechanisms illustrated in FIGS. 5–6 but with the initial buffer cluster allocation to the composite buffer file and designations to the tuner buffer file, in accordance with one embodiment of the invention.

FIGS. 8A–8C are block diagrams of portions of a non-limiting example FAT, illustrating the composite buffering mechanisms illustrated in FIGS. 6A–6E where the tuner buffer file is not immediately dissociated from the clusters used to store media content from a prior display channel after a display channel change, in accordance with one embodiment of the invention.

FIGS. 9A–9C are block diagrams of portions of a non-limiting example FAT, illustrating the composite buffering mechanisms illustrated in FIGS. 6A–6E where one of the tuner buffer files is used to perform recording while the other buffer files are used for receiving surfed media content, in accordance with one embodiment of the invention.

DETAILED DESCRIPTION OF THE PREFERRED EMBODIMENTS

The preferred embodiments of the invention now will be described more fully hereinafter with reference to the accompanying drawings, in which preferred embodiments of the invention are shown. In particular, preferred embodiments of composite buffering will be described. Composite buffering preferably includes a mechanism that can be used to retain and access buffered media content from one or more buffer spaces in a storage device. Composite buffering preferably provides the user with the ability to navigate through a plurality of display channels without losing access to buffered media content from those display channels. In the description that follows, FIGS. 1–3 will provide an example system that could use and benefit from composite buffering. Two implementations for buffering and the various ways that composite buffering can interact with these implementations will be described in association with FIGS. 4–10. Finally, the mechanisms by which the user can view buffered and surfed media content will be described in association with FIGS. 11–15. Composite buffering may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

Figure 1A:
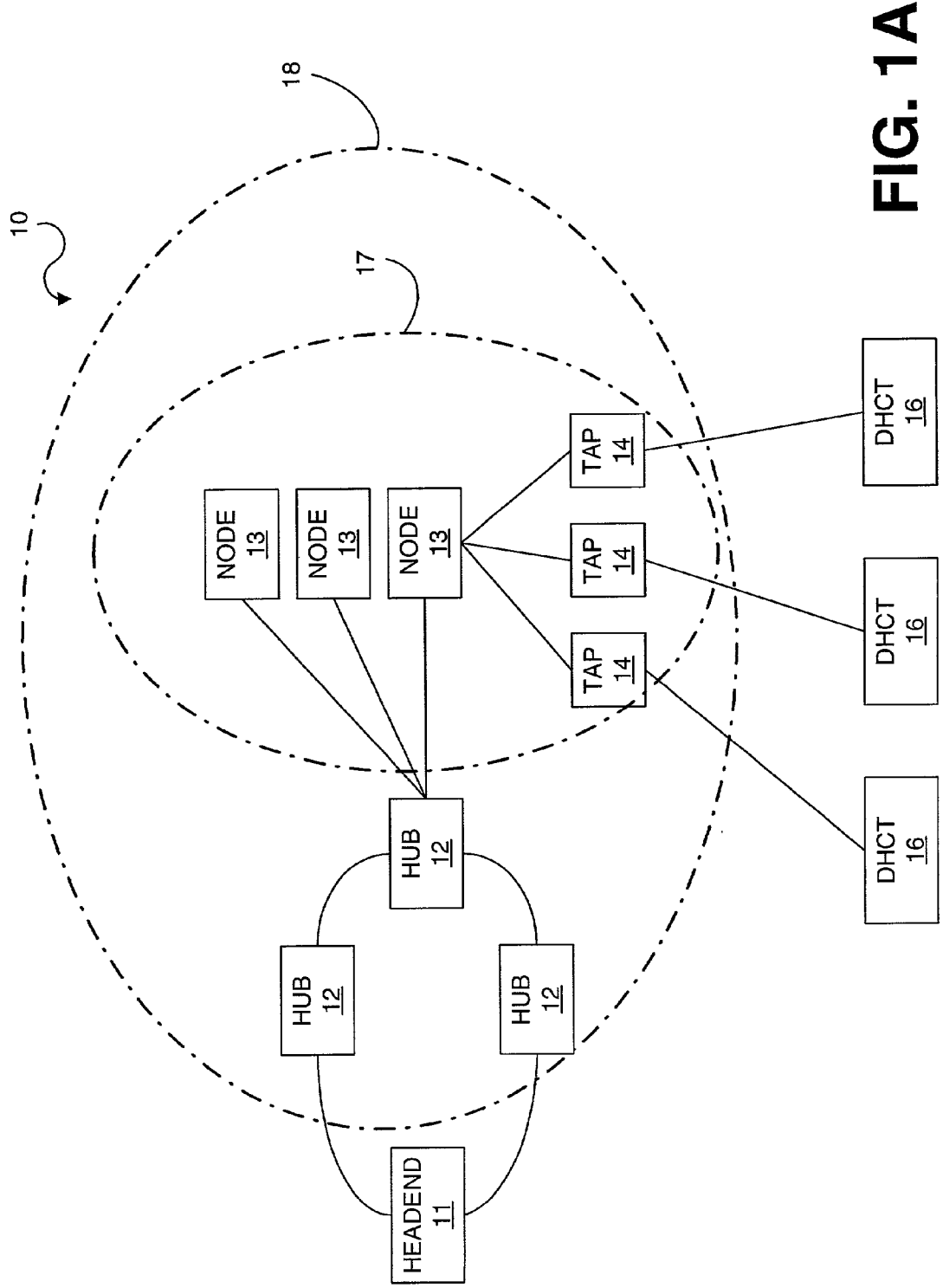
FIG. 1A is a block diagram of a non-limiting example subscriber television system (STS), in accordance with one embodiment of the invention.

One embodiment of the invention is generally implemented as part of a subscriber television system (STS), which includes digital broadband delivery systems (DBDS) and cable television systems (CTS). As a non-limiting example, a subscriber television system (STS) and its operation will be described initially, with the understanding that other conventional data delivery systems are within the scope of the preferred embodiments of the invention. FIG. 1A shows a block diagram view of an STS 10, which is generally a high quality, reliable and integrated network system that is typically capable of delivering video, audio, voice and data services to digital home communication terminals (DHCTs) 16. Although FIG. 1A depicts a high level view of an STS 10, it should be appreciated that a plurality of subscriber television systems can tie together a plurality of regional networks into an integrated global network so that DHCT users can receive media content provided from anywhere in the world. Further, it will be appreciated that the STS 10 shown in FIG. 1A is merely illustrative and should not be construed as implying any limitations upon the scope of the preferred embodiments of the invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, Hybrid Fiber/Coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 typically delivers broadcast video signals as digitally formatted signals in addition to delivering traditional broadcast analog video signals. Furthermore, the system can typically support one way broadcast services as well as both one-way data services and two-way media content and data services. The two-way operation of the network typically allows for user interactivity with services, such as Pay-Per-View programming, Near Video-On-Demand (NVOD) programming according to any of several known NVOD implementation methods, Video-on-Demand (VOD) programming (according to any of several VOD implementation methods), and interactive applications, such as Internet connections. Of course, some embodiments of the present invention do not support services that are 2-way interactive.

The STS 10 also provides the interfaces, network control, transport control, session control, and servers to access media content from media content services, and distributes media content to DHCT users. As shown in FIG. 1A, a typical STS 10 comprises a headend 11, hubs 12, an HFC access network 17, nodes 13, taps 14, and DHCTs 16. It should be appreciated that although a single component (e.g., a headend) is illustrated in FIG. 1A, the STS 10 can feature a plurality of any one of the illustrated components, can omit components, or may be configured with alternative embodiments for any one of the individual components or with yet other additional components not enumerated above.

Media content provided by one or more content providers (not shown) is communicated by the content providers to one or more headends 11. From those headends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area.

The hub 12 connects to the HFC node 13 through a fiber portion of the HFC access network 17. The HFC node 13 is connected to a tap 14, which is connected to a digital home communication terminal (DHCT) 16. Coaxial cables are typically used to couple nodes 13 and taps 14 because the electrical signals can be easily repeated with RF amplifiers. As the high-level operations of many of the functions of an STS 10 are well known to those of ordinary skill in the art, further high level description of the overall STS 10 of FIG. 1A will not be contained herein.

FIG. 1B is a block diagram illustrating the transmission signals supported by the STS 10 (FIG. 1A), where the transmission signals 60, 64, 68, 72 and 76 are input into the DHCT 16 in accordance with one embodiment of the invention. One or more content providers (not shown) are the source of the information that is included in the transmission signals. Before passing through the network 17, transmission signals can be generated at a headend 11 or at a hub 12 (FIG. 1A) that might function as a mini-headend and which therefore possesses some of the headend functionality.

As depicted in FIG. 1B, the STS 10 (FIG. 1A) can simultaneously support a number of transmission signal types, transmission rates, and modulation formats. The ability to carry analog and digital signals over a large bandwidth are characteristics of an HFC network typically employed in an STS, as in the STS 10 of FIG. 1A. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, an STS 10 using HFC supports downstream (i.e., in the direction from the headend 11 to the DHCT 16) frequencies from 50 mega-hertz (MHz) to 870 MHz, whereas upstream frequencies (i.e., in the direction from the DHCT 16 to higher levels of the system) are in the 5 MHz to 42 MHz band. Generally, the RF bandwidth spacing for analog and digital services is 6 MHz. Furthermore, for a typical 870 MHz system in the United States (U.S.), a possible downstream RF spectrum subdivision plan uses 6 MHz frequency subdivisions, or spans, within the 50 MHz to 550 MHz band for analog video transmission signals and within the 550 MHz to 870 MHz range for digital transmission signals. The ATSs 60 shown in FIG. 1B are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio.

Referring again to FIG. 1B, the downstream direction transmission signals, having been multiplexed, and in one embodiment using FDM, are often referred to as in-band transmission signals and include Analog Transmission Signals (ATSs) 60 and Digital Transmission Signals (DTSs) 64, 68, 72 (also known as Digital Transport Signals). These transmission signals carry video, audio, and/or data services. For a non-limiting example, these transmission signals may carry television signals, Internet data, and/or any additional types of data, such as Interactive Program Guide (IPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 60, the DTSs 64, 68, 72 each typically occupies 6 MHz of the RF spectrum. However, the DTSs 64, 68, and 72 are digital transmission signals consisting of 64- or 256-Quadrature Amplitude Modulated (QAM) digital signals formatted using Moving Picture Experts Group (MPEG) standards such as MPEG-2 transport streams, allocated in a separate frequency range. The MPEG-2 transport stream enables transmission of a plurality of DTS types over each 6 MHz RF subdivision, as compared to a 6 MHz ATS. The three types of digital transport signals illustrated in FIG. 1B include broadcast digital transmission signals 64, carousel digital transmission signals 68, and on-demand transmission signals 72.

MPEG-2 transport may be used to multiplex video, audio, and data in each of these DTSs. However, because an MPEG-2 transport stream allows for multiplexed video, audio, and data into the same stream, the DTSs do not necessarily have to be allocated in separate 6 MHz RF frequencies, unlike ATSs 60 in one embodiment. On the other hand, each DTS is capable of carrying multiple broadcast digital media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal (DTS) can carry the video and audio streams of the media content instances of multiple television (TV) stations, as well as media content and data that is not necessarily related to those TV media content instances, as compared to one TV channel broadcast over one ATS 60 that consumes the entire 6 MHz. The digital data is inserted into MPEG transport streams carried through each 6 MHz frequency subdivision assigned for digital transmission, and then demultiplexed at the subscriber DHCT so that multiple sets of data can be produced within each tuned 6 MHz frequency span, or subdivision.

Although broadcast in nature, the carousel DTSs 68 and on-demand DTSs 72 offer different functionality. Continuing with FIG. 1B, the broadcast DTSs 64 and carousel DTSs 68 typically function as continuous feed for indefinite time, whereas the on-demand DTSs 72 are continuous feeds sessions for a limited time. In one embodiment, all DTS types are capable of being transmitted at high data rates. The broadcast DTSs 64 carry typical data comprising multiple digitally-MPEG-2 compressed and formatted TV source signals and other continuously fed data information. The carousel DTSs 68 carry broadcast media content or data that is systematically broadcast in a cycling fashion but updated and revised as needed. Thus, the carousel DTSs 68 serve to carry high volume data such as media content and data and possibly, other data at high data rates. The carousel DTSs 68 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 72, on the other hand, can carry particular information such as compressed video and audio pertaining to subscriber requested media content instance preview and/or media content instance descriptions, as well as other specialized data information.

Preferably, the User-to-Network Download Protocol of the MPEG-2 standard's DSM-CC specification (Digital Storage Media—Command and Control) preferably provides the data carousel protocol used for broadcasting data from a server located at the headend 11, or located elsewhere. It also provides the interactive download protocol for reliable downloading of data from a server (possibly the same server) to an individual DHCT through the on-demand DTSs. Each carousel and on-demand DTS is preferably defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 1B are Out-Of-Band (OOB) signals that provide continuously available two-way signaling to the subscribers' DHCT 16 regardless of which in-band signals are tuned to by the individual DHCT in-band tuners. The OOB signals consist of a Forward Data Signal (FDS) 76 and a Reverse Data Signal (RDS) 80. The OOB signals can comply to any one of a number of well known transport protocols but preferably comply to either a Digital Audio Visual Council (DAVIC) 1.1 Transport Protocol with an FDS of 1.544 mega-bits per second (Mbps) or more using quadrature phase shift keying (QPSK) modulation and an RDS of 1.544 Mbps or more using QPSK modulation, or to a Data Over Cable Service Interface Specification (DOCSIS) Transport Protocol with an FDS of 27 Mbps using 64-QAM modulation and an RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

Figure 2:
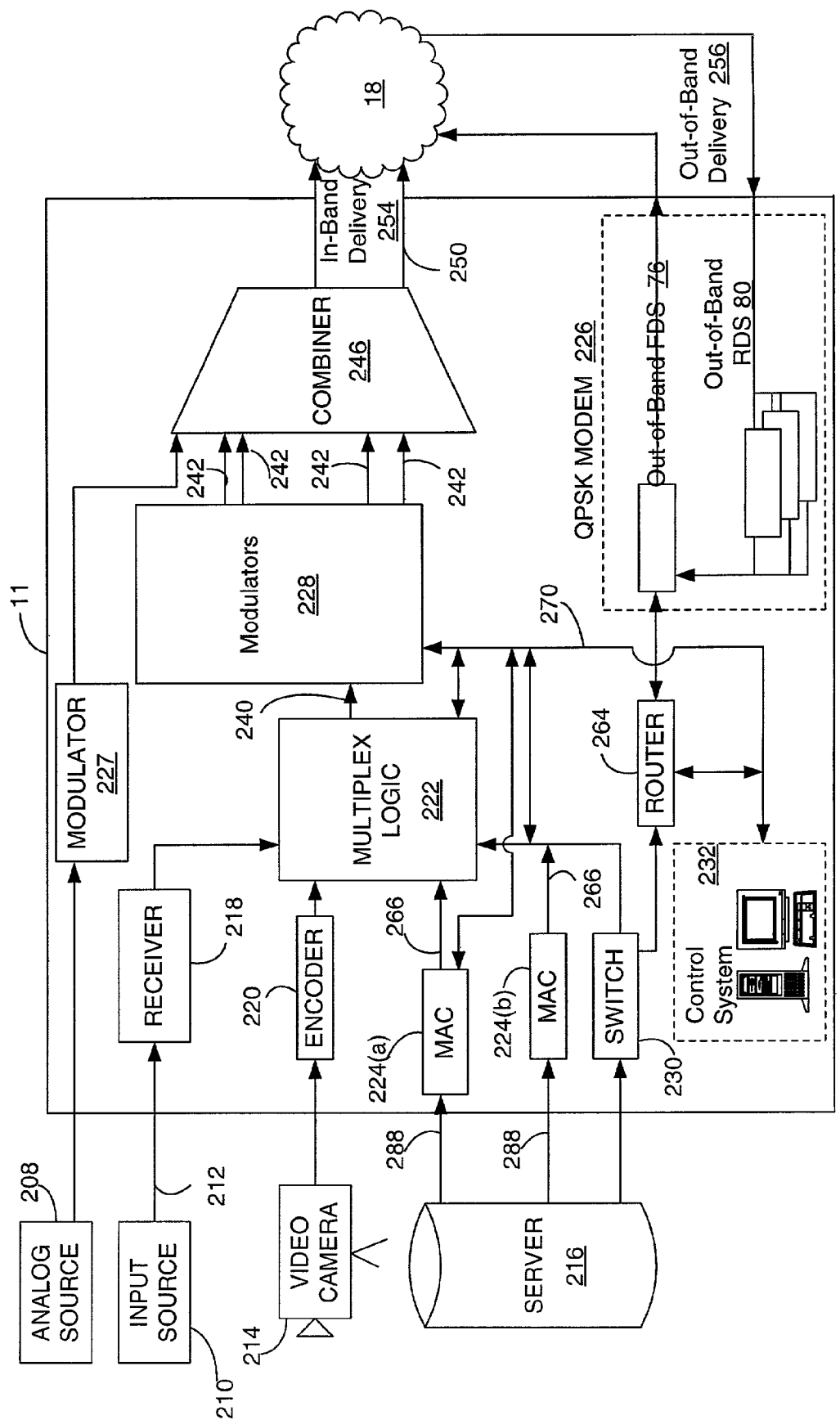
FIG. 2 is a block diagram of a non limiting example headend as depicted in FIG. 1A and related equipment, in accordance with one embodiment of the invention.

FIG. 2 is an overview of one non-limiting example headend 11, which provides the interface between the STS 10 (FIG. 1A) and the service and content providers. The overview of FIG. 2 is equally applicable to one non-limiting example hub 12, and the same elements and principles may be implemented at a hub 12 instead of the headend 11 as described herein. It will be understood that the headend 11 shown in FIG. 2 is merely illustrative and should not be construed as implying any limitations upon the scope of the preferred embodiments of the invention. The headend 11 receives media content from a variety of service and content providers, which can provide input in a variety of ways. The headend 11 combines the media content from the various sources and distributes the media content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown).

The headend 11 can also receive media content from a direct feed source 210 via a direct line 212. Other input sources from content providers include a video camera 214, analog input source 208, or an application server 216. The application server 216 may include more than one line of communication. One or more components such as analog input source 208, input source 210, video camera 214, and application server 216 can be located external to the headend 11, as shown, or internal to the headend 11 as would be appreciated by one having ordinary skill in the art. The signals provided by the media content or programming input sources can include a single media content instance or a multiplex that includes several media content instances.

The headend 11 generally includes one or more receivers 218 that are each associated with a media content source. MPEG encoders, such as encoder 220, are included for digitally encoding local programming or a real-time feed from video camera 214, or the like. The encoder 220 outputs the respective compressed video and audio streams corresponding to the analog audio/video signal received at its input. For non-limiting example, encoder 220 can output formatted MPEG-2 or MPEG-1 packetized elementary (PES) streams or transport streams compliant to the syntax and semantics of the ISO MPEG-2 standard, respectively. The PES or transport streams may be multiplexed with input signals from switch 230, receiver 218 and control system 232. The multiplexing logic 222 processes the input signals and multiplexes at least a portion of the input signals into transport stream 240. Analog input source 208 can provide an analog audio/video broadcast signal that can be input into modulator 227. From modulator 227, a modulated analog output signal can be combined at combiner 246 along with other modulated signals for transmission into transmission medium 250. Alternatively, analog audio/video broadcast signals from analog input source 208 can be input into modulator 228. Alternatively, analog audio/video broadcast signal can be input directly from modulator 227 to transmission medium 250. The analog broadcast media content instances are transmitted via respective RF channels, each assigned for transmission of an analog audio/video signal such as National Television Standards Committee (NTSC) video, as described in association with FIG. 1B.

The switch, such as asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers may download media content to an application server located within the STS 10. The application server 216 may be located within the headend 11 or elsewhere within the STS 10, such as in a hub 12. The various inputs into the headend 11 are then combined with the other information from the control system 232, which is specific to the STS 10, such as local programming and control information, which can include, among other things, conditional access information. The headend 11 contains one or more modulators 228 to convert the received transport streams 240 into modulated output signals suitable for transmission over the transmission medium 250 through the network 18. Each modulator 228 may be a multimodulator including a plurality of modulators, such as, but not limited to, QAM modulators, that radio frequency modulate at least a portion of the transport streams 240 to become output transport streams 242. The output signals 242 from the various modulators 228 or multimodulators are combined, using equipment such as a combiner 246, for input into the transmission medium 250, which is sent via the in-band delivery path 254 to subscriber locations (not shown). In-band delivery path 254 can include DTS 64, 68, 72, and ATS 60, as described with FIG. 1B.

In one embodiment, the server 216 also provides various types of data 288 to the headend 11. The data, in part, is received by the media access control functions 224 that output MPEG transport packets containing data 266 instead of digital audio/video MPEG streams. The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the media content distributed to subscribers. Information, such as conditional access information, is communicated from the control system 232 to the multiplexing logic 222 where it is multiplexed into a transport stream 240.

Among other things, the control system 232 provides input to the modulator 228 for setting the operating parameters, such as selecting certain media content instances or portions of transport streams for inclusion in one or more output transport stream 242, system specific MPEG table packet organization, and/or conditional access information. Control information and other data can be communicated to hubs 12 (FIG. 1A) and DHCTs 16 (FIG. 1A) via an in-band delivery path 254 or via an out-of-band delivery path 256.

The out-of-band data is transmitted via the out-of-band FDS 76 of the transmission medium 250 by means such as, but not limited to, a QPSK modem array 226. Two-way communication utilizes the RDS 80 of the out-of-band delivery path 256. Hubs 12 (FIG. 1A) and DHCTs 16 (FIG. 1A) transmit out-of-band data through the transmission medium 250, and the out-of-band data is received in headend 11 via the out-of-band RDS 80. The out-of-band data is routed through router 264 to an application server 216 or to control system 232. The out-of-band control information includes such information as, among many others, a pay-per-view purchase instruction and a pause viewing command from the subscriber location to a video-on-demand type application server located internally or external to the headend 11, such as application server 216, as well as any other data sent from the DHCT 16 or hubs 12, all of which will preferably be properly timed. The control system 232 also monitors, controls, and coordinates all communications in the subscriber television system, including video, audio, and data. The control system 232 can be located at the headend 11 or remotely. The transmission medium 250 distributes signals from the headend 11 to the other elements in the subscriber television system, such as a hub 12, a node 13, and subscriber locations (FIG. 1A). The transmission medium 250 can incorporate one or more of a variety of media, such as optical fiber, coaxial cable, and HFC, satellite, direct broadcast, or other transmission media.

Figure 3A:
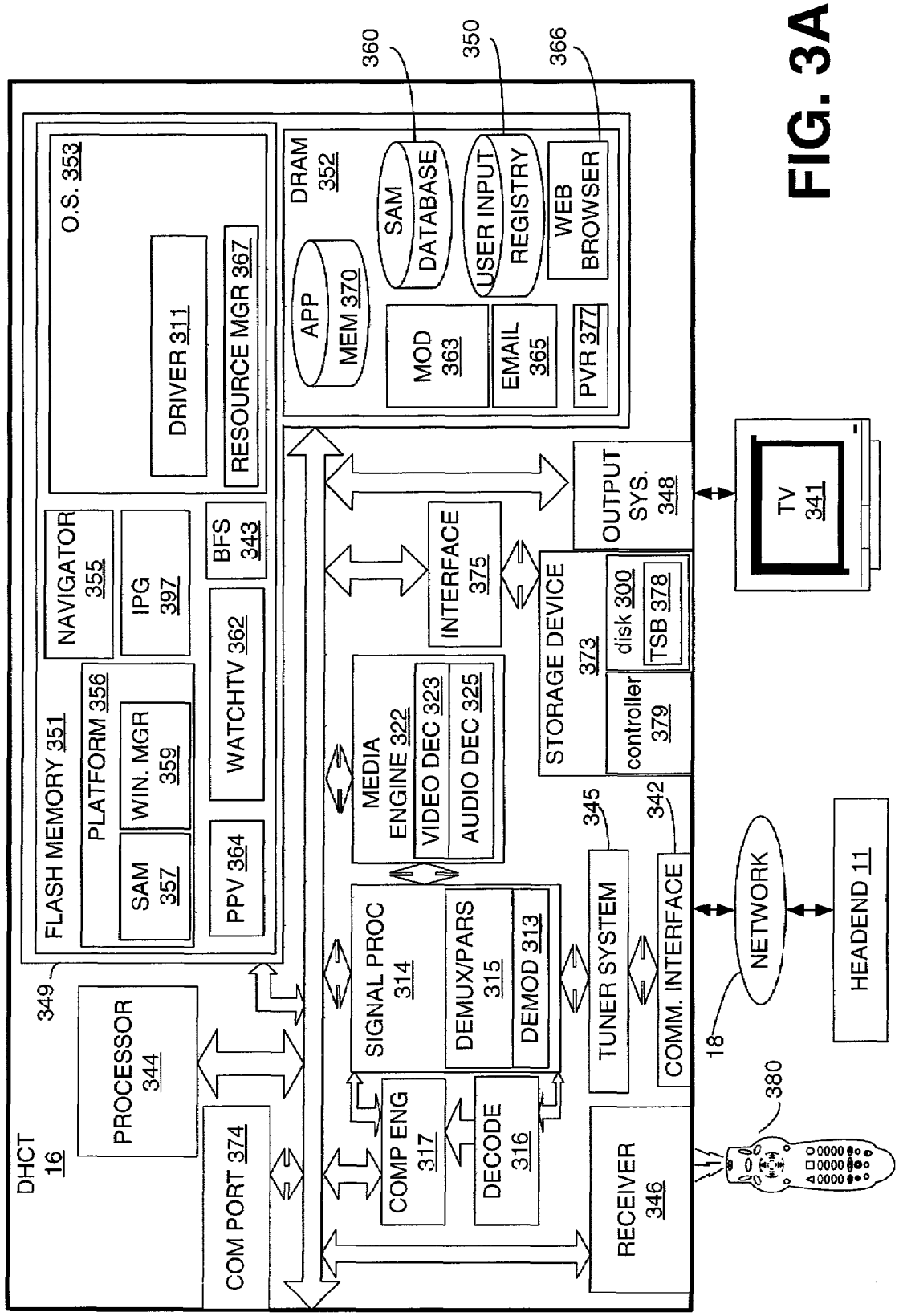
FIG. 3A is a block diagram of a non-limiting example DHCT as depicted in FIG. 1A and related equipment, in accordance with one embodiment of the invention.

FIG. 3A is a block diagram illustration of a non-limiting example DHCT 16 that is coupled to a headend 11 and to a television 341, in accordance with one embodiment of the invention. It will be understood that the DHCT 16 shown in FIG. 3A is merely illustrative and should not be construed as implying any limitations upon the scope of the preferred embodiments of the invention. For a non-limiting example, some of the functionality performed by applications executed in the DHCT 16 (such as the MOD application 363) may instead be performed completely or in part at the headend 11 and vice versa, or not at all in some embodiments. A DHCT 16 is typically situated at the residence or place of business of a user and may be a stand-alone unit or integrated into another device such as, for a non-limiting example, a television set or a personal computer or other display devices or an audio device. The DHCT 16 preferably includes a communications interface 342 for receiving signals (video, audio and/or other data) from the headend 11 through the network 18 and for providing any reverse information to the headend 11 through the network 18.

The DHCT 16 further preferably includes one or more processors, such as processor 344, for controlling operations of the DHCT 16, an output system 348 for driving the television display 341, and at least one tuner system 345 for tuning into a particular television channel or frequency to display media content and for sending and receiving various types of data or media content to and from the headend 11. The DHCT 16 may include, in other embodiments, multiple tuners for receiving downloaded (or transmitted) media content. The tuner system 345 can select from a plurality of transmission signals (FIG. 1B) provided by the subscriber television system. The tuner system 345 enables the DHCT 16 to tune to downstream media content and data transmissions, thereby allowing a user to receive digital and/or analog media content delivered in the downstream transmission via the subscriber television system. The tuner system 345 includes, in one implementation, an out-of-band tuner for bi-directional QPSK data communication and one or more QAM tuners (in band) for receiving television signals. Additionally, a receiver 346 receives externally generated information, such as user inputs or commands from an input device, such as a remote control device 380, or other devices.

According to another embodiment of the invention, a telephone modem (not shown) in the DHCT 16 can be utilized for upstream data transmission and a headend 11, hub 12 (FIG. 1A) or other components located upstream in the STS 10 (FIG. 1A) can receive data from a telephone network corresponding with the telephone modem and can route the upstream data to a destination internal or external to the STS 10, such as an application data server in the headend 11 or content provider.

The DHCT 16 includes a signal processing system 314, which comprises a demodulating system 313 and a transport demultiplexing and parsing system 315 (herein demultiplexing system) to process broadcast media content and/or data. One or more of the systems of the signal processing system 314 can be implemented with software, a combination of software and hardware, or preferably in hardware. The demodulating system 313 comprises functionality for RF signal demodulation, either an analog transmission signal or a digital transmission signal. For instance, demodulating system 313 can demodulate a digital transmission signal in a carrier frequency that was modulated, for a non-limiting example, as a QAM-modulated signal.

When tuned to a carrier frequency corresponding to an analog TV signal transmission, the demultiplexing system 315 is bypassed and the demodulated analog TV signal that is output by demodulating system 313 is instead routed to an analog video decoder 316. The analog video decoder 316 converts the analog video signal (i.e., the video portion of a media content instance that comprises a video portion and an audio portion) received at its input into a respective non-compressed digital representation comprising a sequence of digitized pictures and their respective digitized audio. Presented at the input to the analog video decoder 316 is an analog video signal such as NTSC video comprising of audio and video. In one implementation, the video consists of a sequence of fields spaced apart at approximately one-sixtieth of a second. A pair of consecutive fields constitutes a picture. The odd field contains the odd-numbered lines of the picture and the even field contains the even-numbered lines of the picture. Analog video decoder 316 outputs the corresponding sequence of digitized pictures and respective digitized audio. Each picture is a two dimensional entity of picture elements and each picture element contains a respective set of values. A picture element value comprises luminance and chrominance information that are representative of brightness and color information at the spatial location of the picture element within the picture.

Digitized pictures and respective audio output by analog video decoder 316 are presented at the input of compression engine 317. Digitized pictures and respective audio output by analog video decoder 316 can also be presented to an input of media engine 322 via an interface (not shown) dedicated for non-compressed digitized analog video and audio, such as ITU-656 (International Telecommunications Union or ITU), for display on TV 341. Compression engine 317 is coupled to memory 349 and additionally to a local dedicated memory (not shown) that is preferably DRAM, for input and processing of the input digitized pictures and their respective digitized audio. Alternatively, compression engine 317 can have its own integrated memory (not shown). Compression engine 317 processes the sequence of digitized pictures and digitized audio and converts them into a video compressed stream and an audio compressed stream, respectively. The compressed audio and video streams are produced in accordance with the syntax and semantics of a designated audio and video coding method, such as specified by the MPEG-2 audio and MPEG-2 video ISO (International Organization for Standardization or ISO) standard, so that they can be interpreted by video decoder 323 (or video decompression engine) and audio decoder 325 (or audio decompression engine) for decompression and reconstruction at a future time. Each compressed stream consists of a sequence of data packets containing a header and a payload. Each header contains a unique program identification, or PID, associated with the respective compressed stream.

Compression engine 317 multiplexes the audio and video compressed streams into a transport stream, such as an MPEG-2 transport stream, for output. Furthermore, compression engine 317 can compress audio and video corresponding to more than one media content instance in parallel (e.g., from two tuned analog TV signals when the DHCT 16 possesses multiple tuners) and to multiplex the respective audio and video compressed streams into a single transport stream. The output of compressed streams and/or transport streams produced by compression engine 317 is input to signal processing system 314. Parsing capabilities 315 within the signal processing system 314 allow for interpretation of sequence and picture headers, for instance, annotating their locations within their respective compressed stream for future retrieval from a storage device 373. A compressed analog media content instance (e.g., TV program episode or show) corresponding to a tuned analog transmission channel can be output as a transport stream by signal processing 314 and presented as input for storage in the storage device 373 via the interface 375 as will be described below. The packetized compressed streams can also be output by the signal processing system 314 and presented as input to the media engine 322 for decompression by video decompression engine 323 and audio decompression engine 325 for its display on the TV 341, as will be described below.

The demultiplexing system 315 can include MPEG-2 transport demultiplexing. When tuned to carrier frequencies carrying a digital transmission signal, the demultiplexing system 315 enables the separation of packets of data, corresponding to the compressed streams of information belonging to the desired media content instances, for further processing. Concurrently, the demultiplexing system 315 precludes packets in the multiplexed transport stream that are irrelevant or not desired, such as packets of data corresponding to compressed streams of media content instances of other media content signal sources (e.g., other TV display channels), from further processing.

The parsing capabilities of the demultiplexing system 315 includes reading and interpreting the received transport stream without disturbing its content, such as to interpret sequence and picture headers, for instance, to annotate their locations and corresponding time offset within their respective compressed stream for future retrieval from the storage device 373. Thus, the components of the signal processing system 314 are capable of QAM demodulation, forward error correction, and demultiplexing MPEG-2 transport streams, and parsing elementary streams and packetized elementary streams. A compressed media content instance corresponding to a tuned carrier frequency carrying a digital transmission signal can be output as a transport stream by the signal processing system 314 and presented as input for storage in the storage device 373 via the interface 375 as will be described below. The packetized compressed streams can be also output by the signal processing system 314 and presented as input to the media engine 322 for decompression by the video decompression engine 323 and the audio decompression engine 325 as will be described below.

One having ordinary skill in the art will appreciate that the signal processing system 314 will preferably include other components not shown, including local memory, decryptors, samplers, digitizers (e.g., analog-to-digital converters), and multiplexers. Further, other embodiments will be understood, by those having ordinary skill in the art, to be within the scope of the preferred embodiments of the present invention, including analog signals (e.g., NTSC) that bypass one or more elements of the signal processing system 314 and are forwarded directly to the output system 348. Further, outputs presented at corresponding next-stage inputs for the aforementioned signal processing flow may be connected via accessible memory 349 in which the outputting device stores the output data and the inputting device thereafter inputs the output data written to memory 349 by the respective outputting device. Outputting and inputting devices include analog video decoder 316, compression engine 317, media engine 322, signal processing system 314, and components or subcomponents thereof. Further, it will be understood by those having ordinary skill in the art that components of the signal processing system 314 can be spatially located in different areas of the DHCT 16. Further, it will be understood by those having ordinary skill in the art that, although the components of the signal processing system 314 are illustrated as being in communication with an incoming signal from the communications interface 342, the signal may not necessarily be in the order shown for all signals.

The DHCT 16 also includes the media engine 322, which includes digital video decoder 323 (also known as video decompression engine) and digital audio decoder 325 (also known as audio decompression engine), and other digital signal processing components not shown but which would be appreciated by those having ordinary skill in the art. For a non-limiting example, the demultiplexing system 315 is in communication with the tuner system 345 and the processor 344 to effect reception of digital compressed video streams, digital compressed audio streams, and/or data streams corresponding to one or more media content instances to be separated from other media content instances and/or streams transported in the tuned transmission channel and to be stored in a first part (not shown) of DRAM 352 of DHCT 16 assigned to receive packets of one or more media content instances. Other dedicated memory may also be used for media content instance packets.

Furthermore, while conducting this process, the demultiplexing system 315 demultiplexes and separates desired compressed streams from the received transport stream without disturbing its content. Further, the demultiplexer 315 parses (i.e., reads and interprets) compressed streams such as to interpret sequence headers and picture headers, and deposits a transport stream carrying compressed streams of a first media content instance into DRAM 352. The processor 344 causes the transport stream in DRAM 352 to be transferred to the storage device 373 via the interface 375. Under program control by the processor 344, the demultiplexing system 315, in communication with the digital video decoder 323, the storage device 373, and the processor 344, effect notification and/or transfer of received packets of one or more compressed streams corresponding to one or more media content instances from a first part of DRAM 352 to a second part (not shown) of DRAM 352 assigned to the digital video decoder 323 and the digital audio decoder 325. Alternatively, the media engine 322 can have access to a dedicated localized DRAM (not shown). Upon demultiplexing and parsing the transport stream carrying media content instances, and in communication with processor 344, signal processing system 314 outputs to DRAM 352 ancillary data in the form of a table or data structure (not shown) comprising the relative or absolute location of the beginning of certain pictures in the compressed media content instance for convenience in retrieval during future operations.

In another embodiment, according to a plurality of tuners, and a respective number of demodulating systems 313, demultiplexing systems 315, and signal processing systems 314, a respective number of broadcast digital media content instances are received and routed to a hard disk 300 of the storage device 373 simultaneously while performing the necessary data annotations for each of the respective compressed media streams for their future retrieval from storage device 373. Alternatively, a single demodulating system 313, a single demultiplexing system 315, and a single signal processing system 314, each with sufficient processing capabilities can serve to process more than one digital media content instance. One or more of the received broadcast digital media content instances routed to storage device 373 can be routed simultaneously to media engine 322 for decoding and display to TV 341.

In another embodiment according to the aforementioned description, a first tuner of tuning system 345 receives an analog video signal corresponding to a first media content instance and a second tuner of tuner system 345 receives a digital compressed stream corresponding to a second media content instance. The first media content instance is processed as an analog signal and the second media content instance is processed as a digital compressed stream as described above. The compressed digital version of the analog video signal and/or the second media instance can be routed to the storage device 373 while simultaneously performing the respective data annotations required for future retrieval. Additionally, either or both of the media content instances can be routed simultaneously to media engine 322 for decoding and display on TV 341.

In one implementation, the compression engine 317 can output formatted MPEG-2 or MPEG-1 packetized elementary streams (PES) inside a transport stream, all compliant to the syntax and semantics of the ISO MPEG-2 standard. Alternatively, the compression engine 317 can output other digital formats that are compliant to other standards. The digital compressed streams output by the compression engine 317 corresponding to a media content instance are preferably deposited in local, dedicated memory for the compression engine 317 and routed to the demultiplexing system 315. The demultiplexing system 315 parses (i.e., reads and interprets) the transport stream generated by the compression engine 317 without disturbing its content, such as to interpret picture headers, and deposits the transport stream into DRAM 352 (or other dedicated DRAM, not shown). The processor 344 causes transport stream in DRAM 352 to be transferred to the storage device 373. While parsing the transport stream, the demultiplexing system 315 outputs to the memory 352 ancillary data in the form of a table or data structure (not shown) comprising the relative or absolute location of the beginning of certain pictures in the compressed media content stream for the media content instance for convenience in retrieval during future operations. In this way, random access operations such as fast forward, rewind, and jumping to a location in the compressed media content instance can be attained.

In another embodiment, according to a plurality of tuners, a respective number of analog video decoders 316, and a respective number of compression engines 317, the aforementioned compression of analog video and audio is performed and routed to the hard disk 300 of the storage device 373 simultaneously on a respective number of analog media content instances. Alternatively, a single compression engine with sufficient processing capabilities can serve to compress more than one analog media content instance.

One or more programmed software applications, herein referred to as applications, are executed by utilizing the computing resources in the DHCT 16. Note that an application typically includes a client part and a server counterpart that cooperate to provide the complete functionality of the application. The applications may be resident in FLASH memory 351 or downloaded (or uploaded) into DRAM 352. Applications stored in FLASH memory 351 or DRAM 352 are executed by the processor 344 (e.g., a central processing unit or digital signal processor) under the auspices of the operating system 353. Data required as input by an application is stored in DRAM 352 or FLASH memory 351 and read by the processor 344 as need be during the course of application execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by the processor 344 during the course of application execution. DRAM 352 also includes application memory 370 that various applications may use for storing and/or retrieving data.

An application referred to as a navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for a non-limiting example, blocking a channel or a group of channels from being displayed in a channel menu presented on a screen display.

The FLASH memory 351 also contains a platform library 356. The platform library 356 is a collection of utilities useful to applications, such as a timer manager, a compression manager, a configuration manager, a hyper text markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3A are a window manager 359 and a service application manager (SAM) application 357.

The window manager 359 provides a mechanism for implementing the sharing of the screen regions and user input. The window manager 359 in the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 16 should receive data corresponding to the input key and in which order. As an application is executed, it registers a request to receive certain user input keys or commands. When the user presses a key corresponding to one of the commands on the remote control device 380, the command is received by the receiver 346 and relayed to the processor 344. The processor 344 dispatches the event to the operating system 353 where it is forwarded to the window manager 359 which ultimately accesses the user input registry 350 and routes data corresponding to the incoming command to the appropriate application.

The SAM application 357 is a client component of a client-server pair of components, with the server component (not shown) being located on the headend 11, preferably in the control system 232 (FIG. 2). A SAM database 360 (i.e., structured data such as a database or data structure) in DRAM 352 includes a data structure of services and a data structure of channels that are created and updated by the headend 11. Herein, database will refer to a database, structured data or other data structures as is well known to those of ordinary skill in the art. Many services can be defined using the same application component, with different parameters. Non-limiting examples of services include, without limitation and in accordance with one implementation, presenting television instances (available through a WatchTV application 362), pay-per-view events (available through a PPV application 364), digital music (not shown), media-on-demand (available through an MOD application 363), and an interactive program guide (IPG) 397. In general, the identification of a service includes the identification of an executable application that provides the service along with a set of application-dependent parameters that indicate to the application the service to be provided. As a non-limiting example, a service of presenting a television instance (media content instance) could be executed by the WatchTV application 362 with a set of parameters specifying the HBO to view HBO or with a separate set of parameters to view CNN. Each association of the application component (tune video) and one parameter component (HBO or CNN) represents a particular service that has a unique service I.D. The SAM application 357 also interfaces with the resource manager 367 to control resources of the DHCT 16.

Applications can also be downloaded into DRAM 352 at the request of the SAM application 357, typically in response to a request by the user or in response to a message from the headend 11. In the non-limiting example DHCT 16 illustrated in FIG. 3A, DRAM 352 includes a media-on-demand application (MOD) 363, an e-mail application 365, PVR application 377, and a web browser application 366. It should be clear to one with ordinary skill in the art that these applications are not limiting and merely serve as non-limiting examples for embodiments of the invention. Furthermore, one or more DRAM based applications may be resident, as an alternative embodiment, in FLASH memory 351. These applications, and others provided by the subscriber television system operator, are top-level software entities on the network for providing services to the user.

In one implementation, applications executing on the DHCT 16 work with the navigator 355 by abiding by several guidelines. First, an application utilizes the SAM application 357 for the provision, activation, and suspension of services. Second, an application shares DHCT 16 resources with other applications and abides by the resource management policies of the SAM application 357, the operating system 353, and the DHCT 16. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application is designed to not have access to certain user input keys reserved by the navigator (i.e., power, channel +/−, volume +/−, etc.).

The MOD application 363 provides the user with lists of available media content titles for each media content instance to choose from and with media content instances requested by the user. The MOD application 363 provides media content to the user by engaging, typically, in a direct two-way IP (Internet Protocol) connection with VOD content servers (not shown) that would be located, in one embodiment, in the headend 11.

An executable program or algorithm corresponding to an operating system (OS) component, or to a client platform component, or to an application, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application, or to respective parts thereof, can reside in FLASH memory 351, or in a local storage device (such as storage device 373) externally connected to or integrated into the DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

The DHCT 16 may also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be provided, for a non-limiting example, by an input device including a computer or transmitter with buttons or keys located either on the exterior of the terminal or by a hand-held remote control device 380 or keyboard that includes user-actuated buttons, or even aural input (e.g., voice activated).

The DHCT 16 includes at least one storage device 373 to provide storage for downloaded media content. Among others, the storage device 373 can be an optical storage device or a magnetic storage device, and is preferably a hard disk drive. The storage device 373 comprises storage for media content and/or data that can be written to for storage and later read from for retrieval for presentation. The storage device 373 preferably includes at least one hard disk 300. Throughout this disclosure, references relating to writing to or reading from the storage device 373, or references regarding recordings from or to the storage device 373 will be understood to include read or write operations occurring to the actual medium (for non-limiting example, the hard disk 300) of the storage device 373. The storage device 373 is also comprised of a controller 379 that receives operating instructions from the device driver 311 of the operating system 353 (as described below) and implements those instructions to cause read and/or write operations to the hard disk 300. The device driver 311 communicates with the storage device controller 379 to format the hard disk 300, causing the hard disk to be divided radially into sectors 301 and concentric circles called tracks 302, as illustrated by the block diagram illustration of the non-limiting example hard disk 300 in FIG. 3B. Note from FIG. 3B that the same number of sectors 301 per track 302 are illustrated, but other embodiments with a different number of tracks per side, sectors per track, bytes per sector, and in different zones of tracks, are within the scope of the preferred embodiments of the invention. The sector 301 is the basic unit of storage on the hard disk 300. In one implementation, each sector 301 of a hard disk 300 can store 512 bytes of user data. While data is stored in 512-byte sectors on the hard disk 300, the cluster, for a non-limiting example cluster 303, is typically the minimum unit of data storage the operating system 353 uses to store information. Two or more sectors on a single track make up a cluster.

Referring again to FIG. 3A, storage device 373 is preferably internal to DHCT 16, coupled to a common bus through a communication interface 375, preferably an integrated drive electronics (IDE) interface or small computer system interface (SCSI), although IEEE-1394 or USB can be used. In other embodiments, the storage device 373 can be externally connected to (and thus removable from) the DHCT 16 via a communication port 374 implemented as IEEE-1394 or USB or as a data interface port such as a SCSI or an IDE interface. In one implementation, under the auspices of the real-time operating system 353 (as described below) and executed by the processor 344, and in coordination with the personal video recording (PVR) application 377, the device driver 311, and the device controller 379 (the latter three components described below), downloaded media content (herein understood to also refer to other types of data, in addition to, or instead of, media content instances) are received in the DHCT 16 via the communications interface 342, processed as described above, and stored in a temporary cache (not shown) in memory 349. The temporary cache is implemented and managed to enable media content transfers from the temporary cache to the storage device 373, or, in concert with the insertion of a newly arriving media content into the temporary cache. In one implementation, the fast access time and high data transfer rate characteristics of the storage device 373 enables media content to be read from the temporary cache in memory 349 and written to the storage device 373 in a sufficiently fast manner. Orchestration of multiple simultaneous data transfer operations is effected so that while media content is being transferred from the cache in memory 349 to the storage device 373, new media content is received and stored in the temporary cache of memory 349. In other implementations, the downloaded media content is received through the communications port 374 in the DHCT 16 and then transferred directly to the storage device 373, thus bypassing the temporary cache.

The operating system 353, device driver 311, and controller 379 communicate under program execution in the processor 344 and/or via the interrupt and messaging capabilities of DHCT 16 and thus cooperate to create a special file in one of the hard disk sectors called a file allocation table (FAT) (not shown). The FAT is where the operating system 353 stores the information about the hard disk's directory, or media content instance file folder structure, and which clusters are assigned and associated with a file and thus used to store media content instances. The operating system 353 can determine where a file's data is located by using the directory entry (not shown) for the file and the entries of the FAT 304. The directory entry gives information about a directory such as its related files and subdirectories and create time, and special permissions. A FAT entry describes the physical locations of data associated with media content downloaded to the hard disk 300 of the storage device 373. The FAT also keeps track of which clusters are free, or open, and thus available for use. Updates to the FAT are provided for by the operating system 353, or the device driver 311, or a combination of both. Writes to the hard disk are coordinated between the PVR application 377 (described below), the operating system 353, the device driver 311, and the storage device controller 379.

The PVR application 377, operating system 353, and device driver 311 execute respective programmed instructions in the processor 344. The processor 344, storage controller 379 and demultiplexing system 315 communicate via interrupt and messaging capabilities of the DHCT 16. The PVR application 377 in communication with the operating system 353, device driver 311 and the storage device controller 379 and the demultiplexing system 315 effect retrieval of compressed video streams, compressed audio streams, and data streams corresponding to one or more media content instances from the storage device 373. Retrieved streams are deposited in an output cache in the storage device 373 and transferred to DRAM 352, and then processed for playback according to mechanisms well known to those having ordinary skill in the art. In some embodiments, the media content instances are retrieved and routed from the hard disk 300 to the video and audio decoding system 323 and 325 simultaneously, and then further processed for eventual presentation on a display device or other device.

The PVR application 377 provides for media content recording functionality by enabling the temporary writing to, and if requested, more permanent recording (i.e., relatively permanent) to the storage device 373. Media content can be transmitted (or downloaded) from a remote location, such as, for a non-limiting example, a remote server located in the headend 11, or from a home communication network, or from other consumer electronic devices (generally referred to herein as media content devices). Downloaded media content that is received at each tuner of tuner system 345 is temporarily stored, or buffered, on the hard disk 300 of the storage device 373. The corresponding space on the hard disk 300 is called buffer space, or a time shift buffer (TSB) 378. In a preferred embodiment, each tuner in tuner system 345 has a respective TSB 378. Although one TSB 378 is shown, it will be understood that more TSBs can be used with multiple tuners. Moreover, media content instances sourced from a media content device such as a camera attached to the DHCT 16 via communication port 374 can have a respective TSB 378. Note that buffering is understood to include temporarily maintaining received media content, resulting from, among others, a local attached device or either from reception of a broadcast digital channel or a digital compressed version of a broadcast analog channel and/or data in the buffer space (or tuner buffer), or TSB 378, of the storage device 373.

Under normal operation, the PVR application 377 effectively associates a temporary recording designation with the media content received into the TSB 378. The media content stored in the TSB 378 will preferably either be deleted (i.e., the clusters storing the media content will be configured as writeable for eventual write operations that overwrite the media content within those clusters or immediately overwritten) or retained (through election by the user as one non-limiting example) as a permanent recording. A permanent recording will be understood to include media content that is stored for an extended period of time as decided by the user. Permanent recordings are stored in non-buffer clusters (i.e., not in the clusters assigned to the TSB 378) that are not used for the TSB 378 in instances when the user elects in advance to make a scheduled recording of a media content instance that has not yet been tuned to at the DHCT 16. A permanent recording can also be achieved by the user selecting a media content instance stored in the TSB 378 and designating the media content instance as permanent. In this latter implementation, the designated media content is stored in clusters that are configured (i.e., re-designated) from TSB clusters to permanent recording clusters (non-buffer clusters). To compensate for the re-designation of clusters to a permanent recording, the device driver 311 assigns and associates an equivalent number of clusters to the TSB 378 that it obtains from a pool of available unused and/or writeable (e.g., repossesed) clusters thus permitting continuance of normal TSB behavior and management. Thus, permanent recordings will preferably be more permanent than media content in the TSB 378, and permanent recordings can eventually be deleted from the disk space, typically at the explicit request of a user, as one non-limiting example.

There is a duration, associated with the TSB 378, which represents how much data is held by the TSB 378. This duration could represent, in one embodiment, actual media content instance time. In such a time-duration embodiment, the PVR application 377, in cooperation with the device driver 311, will preferably maintain a substantially constant buffer space capacity suitable for a certain duration of media content instance time, for a non-limiting example, 3–4 hours worth of media content instances. Media content instance-time tracking is related to hard disk space tracking if a constant data rate, or buffering rate, is assumed or estimated. In a preferred embodiment, the duration of the TSB 378 represents hard disk space. The PVR application 377 can set a buffer size capacity, for a non-limiting example 3 gigabytes (GB), and then track the disk space used for the TSB 378 to ensure a substantially constant TSB capacity. For a non-limiting example, before the PVR application 377 effects a write to the storage device 373, it can query the device driver 311 (through the operating system 353) to determine the available hard disk space. After the write operation, the PVR application 377 again can poll the device driver 311 to get an update on available hard disk space.

One of several embodiments for maintaining and managing the TSB 378 (or a plurality of TSBs) includes associating a single file for each TSB 378, and controlling the allocation, removal, and replacement of clusters on the disk space at the device driver 311 level. In this embodiment, further described in the patent applications entitled, "DISK DRIVER CLUSTER MANAGEMENT OF TIME SHIFT BUFFER WITH FILE ALLOCATION TABLE STRUCTURE," filed Dec. 5, 2001 under Ser. No. 10,005,628, and "APPLICATION MANAGEMENT AND INTERFACE FOR CLUSTER CONTROL OF TIME SHIFT BUFFER," filed Dec. 5, 2001 under Ser. No. 10/010,781, both assigned to Scientific Atlanta, and both herein entirely incorporated by reference," the PVR application 377 requests the allocation of disk space for a single file (i.e., a buffer file, whether a tuner buffer file or composite buffer file) for each TSB 378. For each TSB 378, the device driver 311, implemented as either a separate software module, or integrated with the operating system 353, allocates enough clusters and assigns them to the respective file to meet the size requirement designated by the PVR application 377. Media content can then be downloaded and written into the clusters of that buffer file. When a user decides to designate one of the media content instances in the buffer file as permanent, the user, in one embodiment, can simply rewind to the location of that media content instance and select record. A permanent file is then created and associated with the clusters storing the desired media content instance. The permanent file temporarily shares the clusters associated with the selected media content with the buffer file until replacement clusters are allocated by the device driver 311 for the buffer file in order to replace the clusters associated with the permanent recording. Sharing is preferably accomplished by the device driver 311 maintaining a file sharing counter and file associations in the FAT for every cluster of the disk space. File sharing counts greater than one (e.g., in the case of a buffer file and a permanent recording file sharing the same cluster) can prompt the device driver 311 to not re-employ a cluster but to remove the assignment and association of shared clusters to the respective buffer file. Thus, the device driver 311 does not effect deletion of information associated with media content stored in shared clusters that are associated with one or more files. To compensate for the disassocation of clusters shared with a second file (i.e., the permanent recording file), device driver 311 assigns and associates an equivalent number of clusters to TSB 378 that it obtains from a pool of available unused and/or writeable clusters thus permitting continuance of normal TSB behavior and management. Media content instances downloaded to the TSB 378 are tracked and preferably delineated by time. The device driver 311 provides a software generated pointer, called Normal Play Time (NPT), which points to locations within files and locations within media content instances within those files. Based on the Lightweight Stream Control Protocol, NPT can be thought of as the clock associated with a video asset (as distinguished from the real-time clock (not shown) for the DHCT 16). For every file that is created for media content downloaded to the storage device 373, an NPT is generated. There is an NPT for the read head of the storage device 373 and for the write head of the storage device 373. For writing media content to the storage device 373 for a newly created file (e.g., a TSB file), an NPT is created for the write head of the storage device 373 with an initial value of zero. In one implementation, the device driver 311 receives a periodic interrupt (for a non-limiting example, every 5–10 msec) set up by the PVR application 377 through the computer services of the operating system 353. This interrupt is synchronized with the internal real-time clock (not shown) of the DHCT 16 in order to advance the pointer (i.e., the NPT) at a substantially constant rate. The NPT continues to increase in value (from an initial value of zero) until the associated file is closed. For the read head of the storage device 373, the NPT starts at 0 at the start of the file, advances in real time in normal play mode, advances faster than real time in fast forward mode, decrements in rewind mode, and is fixed when the video is paused.

The PVR application 377 maintains a data structure, or data record, for every downloaded media content instance. This data structure is preferably maintained on the hard disk 300 of the storage device 373, but can be maintained in memory 349 also. The data structure includes, for a non-limiting example, the NPT values defining the start and end times of the downloaded media content instance, the real-time values corresponding to the start and end times of the media content instances, as well as the corresponding media content instance guide data (e.g., similar to the IPG guide data), among other elements. The device driver 311 maintains the mapping between NPT and the cluster and sector locations of media content in a separate look-up table data structure (not shown) preferably located on the hard disk 300. In one embodiment, the device driver 311 can sample the current write location (i.e., cluster and sector location provided by the storage device controller 379) as the write head of the storage device 373 advances, and store that cluster and sector location in the look-up table data structure along with a corresponding NPT value. This sampling can occur, for a non-limiting example, every 5–10 msec. In an alternative embodiment, the device driver 311 can record some initial samples and through an estimation algorithm (e.g., interpolation) estimate file locations and locations within said files. When the PVR application 377 references a particular media content instance (for a non-limiting example, where a user seeks to rewind to a downloaded media content instance stored on the hard disk 300), the PVR application 377 passes the stored start and stop NPT values for that media content instance to the device driver 311, and the device driver 311 determines the hard disk locations from the look-up table data structure. The PVR application 377 also correlates NPT read values for locations within the media content instances to the real-time clock value.

Broadcast media content can include different services, provisioned for, in one implementation, by an application such as Watch TV 362. One or more services (e.g., CNN, HBO, ESPN) can occur in the same media content stream (e.g., in a transmission signal from the headend at the same carrier frequency), or may need to be accessed from another media content stream by tuning (via tuner system 345) to a different carrier frequency. As discussed above, channels are often referred to as the bandwidth, or frequency span, of a broadcast analog signal. A display channel, on the other hand, is the channel displayed to the user on a display device, such as the screen of the television 341. The display channel corresponds to a service. This service to display channel translation preferably occurs at the SAM application 357. Alternatively, the translation can occur in part or entirely at a SAM server (not shown) located at the headend 11 (FIG. 2) or at a hub 12 (FIG. 1A) serving as a mini-headend. Thus, a user selects a service preferably by selecting a display channel from a remote control device 380.

Figure 3C:
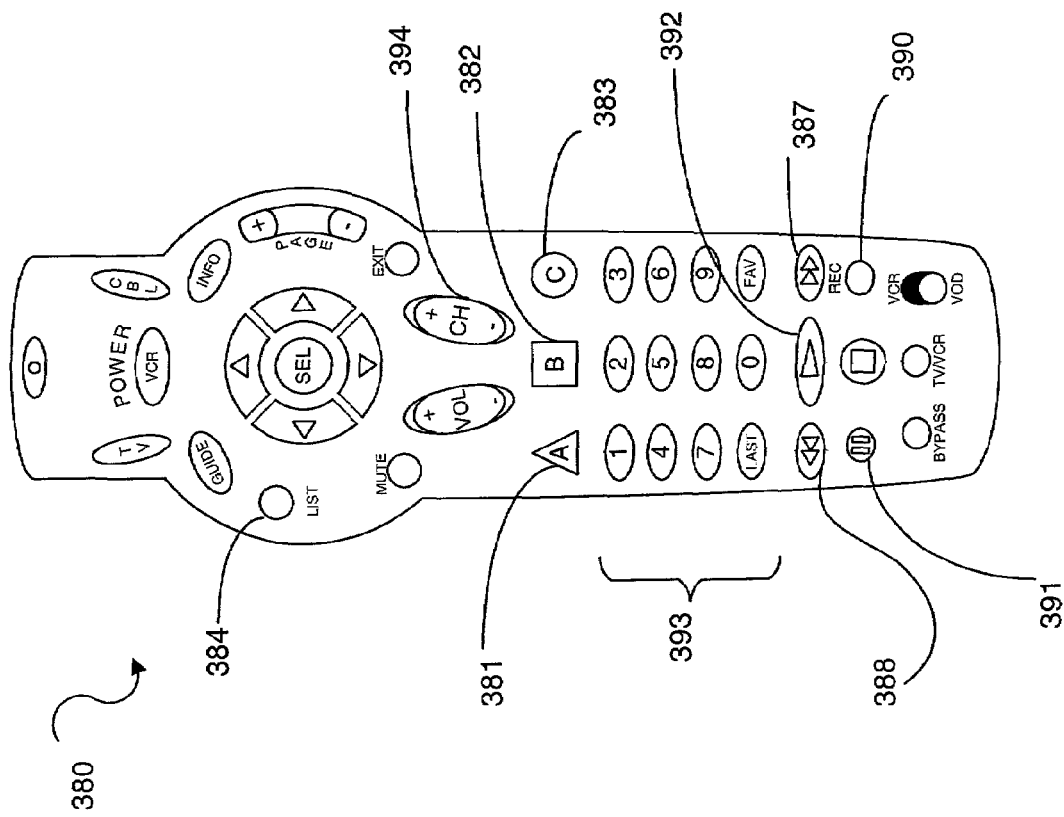
FIG. 3C is a schematic diagram of a non-limiting example remote control device, as depicted in FIG. 3A, used to provide input to the DHCT 16 illustrated in FIG. 3A, in accordance with one embodiment of the invention.

A display channel is selected, and changed, by a user, typically via pressing a key or button on a remote control device, such as that depicted in FIG. 3C. Rewind 388 and fast-forward 387 buttons enable a user to access buffered media content instances in the TSB 378 (FIG. 3A). The record button 390 enables the user to designate, as permanently recorded, any media content instance buffered into the TSB 378, as described below. The pause button 391 enables the user to pause a media content instance, or pause during a search for a particular media content instance. The playback button 392 enables the playback of a media content instance. The "A" 381, "B" 382, and "C" 383 buttons can correspond to certain application-defined functions that have a corresponding "A", "B", or "C" symbol displayed in a graphics user interface (GUI) presented on a display device. The list button 384 can be used to evoke various PVR application 377 user interface screens. The number buttons 393 enable the user to select a display channel for viewing media content. The user can also scroll through the display channels using the channel navigation button 394. Many alternative methods of providing user input may be used including a remote control device with different buttons and/or button layouts, a keyboard device, a voice activated device, among other devices. The embodiments of the invention described herein are not limited by the type of device used to provide user input.

Note also that a display channel change can, but does not necessarily, involve a change in carrier frequency. As described above in association with FIG. 1B and FIG. 3A, media content from such services as, for a non-limiting example, CNN and ESPN, can be in the same digital transmission signal under different packet identifications (PIDs). For a non-limiting example, the user can be viewing ESPN, and decide he or she wants to watch CNN. The user selects one of the display channel numbers 393 on the remote 380 (or scrolls up and down for the channel using the channel navigation button 394), and the signal processing system 314 of FIG. 3A, as described above, can extract the currently viewed media content of that particular service, based on the PID for that particular service (here, the CNN service). Thus, if the requested services are accessed in the same media content stream (e.g., in a digital transmission signal at one carrier frequency), a carrier frequency change is not necessary. Of course, access to media content from a different media content stream typically requires that the tuner system 345 tune to a different carrier frequency after the keypress event, much like accessing media content among different analog broadcast channels. As will be described below, in a multi-tuner embodiment, the display channel changes will preferably result in switching from one tuner of the tuner system 345 (FIG. 3A) to another tuner of the tuner system 345.

In a single tuner embodiment, the media content is downloaded to the buffer space clusters for temporary residence, unless the user chooses to make the media content permanent, as discussed above. In one implementation, the clusters used for temporary residence preferably have a file association (a tuner buffer file) maintained in a FAT. The clusters assigned and associated with the tuner buffer file will receive media content from the display channel selected by the user. As the media content continues to be downloaded to the buffer space of the tuner buffer file and the capacity of the buffer space is about to be exceeded, the write head can return to the first cluster of the buffer space and begin overwriting media content, or in other embodiments, the first cluster of the buffer space can be dissociated from the tuner buffer file and the tuner buffer file can be associated with a replacement buffer cluster. In both embodiments, one of the objectives of the buffering mechanisms is to maintain a substantially constant buffer space. Typically, when the user changes the display channel (e.g., via a keypress event), the media content within the buffer space (or buffer) is deleted. Herein, the term "deleted" in the context of composite buffering will be understood to include the notion the cluster storing the media content on the hard disk is made writeable. This deletion allows the write head, in one implementation, to return to the first cluster of the tuner buffer file to begin writing media content from the current display channel. Thus, media content previously viewed by the user on a prior display channel is effectively "lost."

Figure 4A:
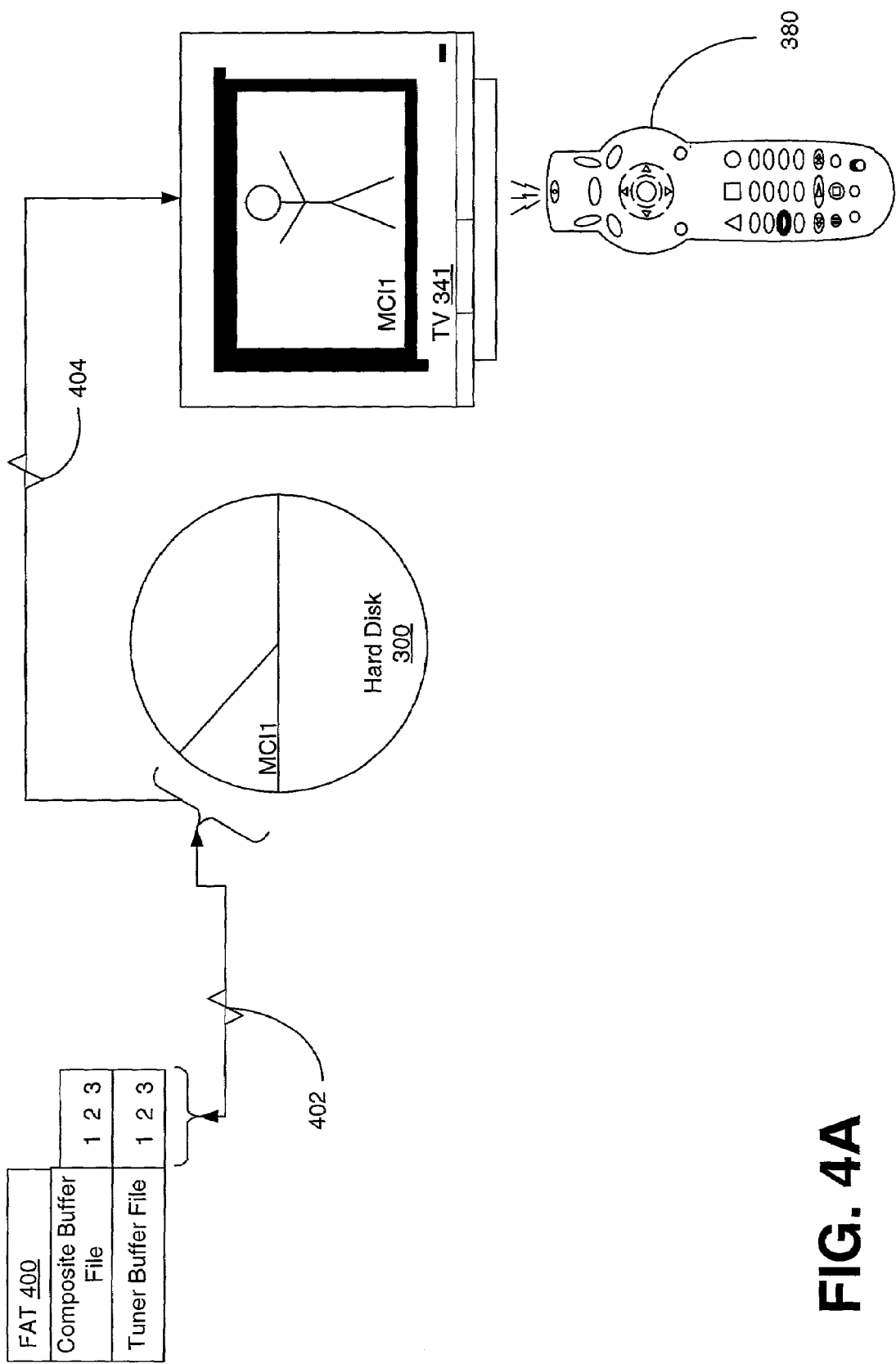
FIGS. 4A–4D are schematic diagrams illustrating the cooperation between relevant DHCT system elements in single tuner and multi-tuner composite buffering implementations, in accordance with several embodiments of the invention.

One mechanism for enabling the user to view media content from prior display channels is to employ a composite buffer file in addition to a tuner buffer file. FIGS. 4A–4D are schematic diagrams that will be used to describe, at a higher level of abstraction, such a mechanism for single tuner and multi-tuner implementations. As will be clearer in the context of the description below, FIGS. 4A–4D illustrate one non-limiting example among other non-limiting examples. Further description of other non-limiting examples are described in association with later figures. Beginning with FIG. 4A, several DHCT elements are shown, including a FAT 400, a hard disk 300, a television 341, and a remote control device 380. Although the DHCT 16 is not shown, it can be located in the TV 341, or in proximity to the TV 341. The FAT 400 includes a partial list entry of allocated clusters (e.g., 1–3) for the tuner buffer file, which are associated with a composite buffer file. In the figures that follow, it will be understood that the tuner buffer file and the composite buffer file are files that, in one embodiment, are associated with (e.g., point to) the allocated clusters shown in the following file allocation tables, and which have filenames listed in the file allocation table, such as, for example, the "Tuner Buffer File" or the "Composite Buffer File". The FAT 400 serves as a pointer to the allocated clusters located in the buffer space on the hard disk 300, as indicated by the dual-arrowhead, interrupted line 402. The interrupted line 402 represents that communication between the FAT 400 and the hard disk 300 can occur through multiple DHCT elements, as described above. The single-arrowhead, interrupted line 404 is used to illustrate that media content instances stored in the buffer space of the hard disk, such as media content instance 1 (MCI 1), will be delivered through one or more DHCT elements to the television 341 for display. The remote control device 380, pointing for example to a DHCT 16 located proximately to the TV 341, for example, will be used to evoke a display channel change, as shown in FIG. 4A.

Figure 4B:
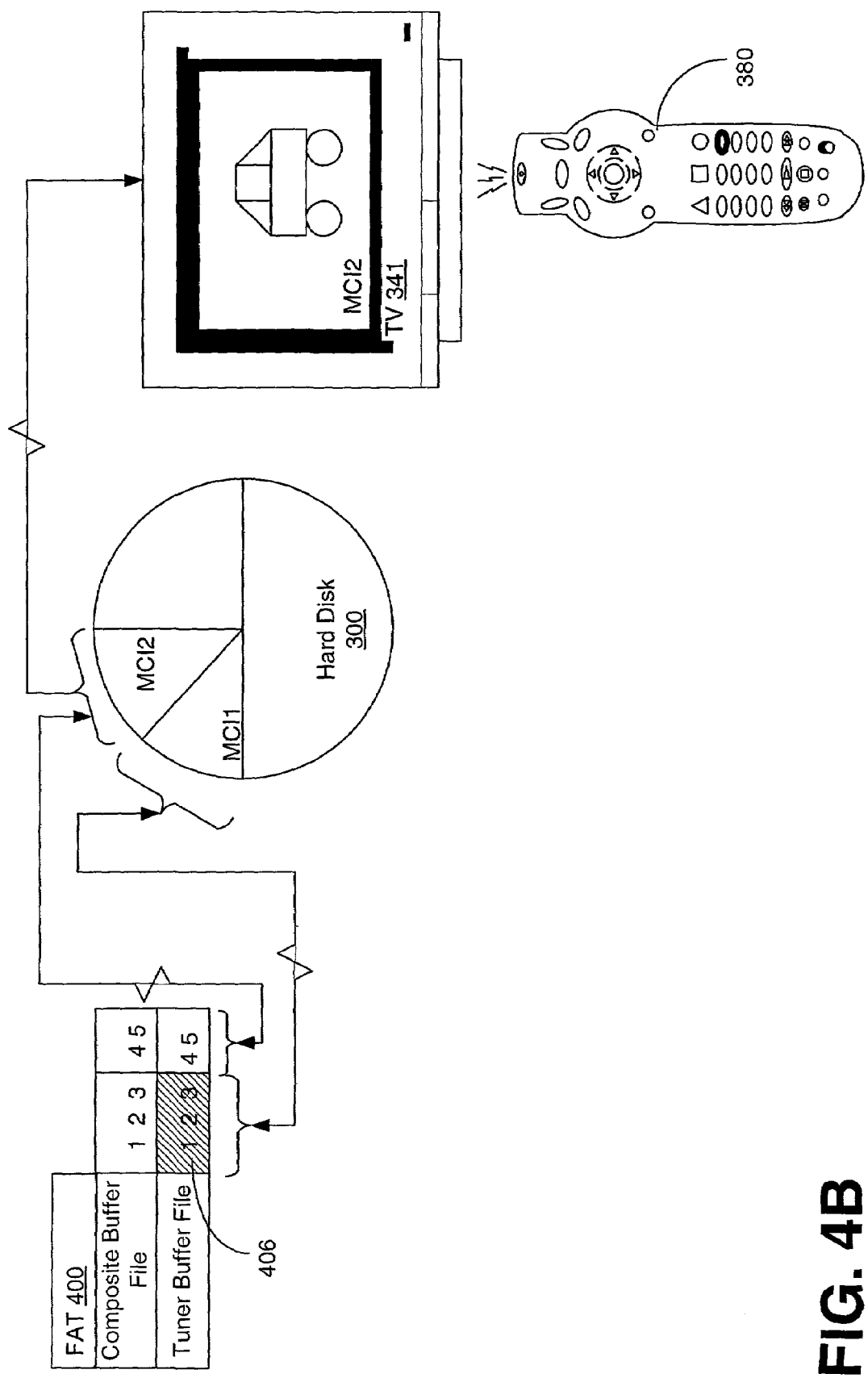

As media content is written to the buffer space on the hard disk 300, the composite buffer file can preferably be associated with the same clusters assigned to the tuner buffer file, thus utilizing the file sharing mechanism described above. This file sharing is illustrated in the FAT 400 by the tuner buffer file and the composite buffer file sharing the same clusters 1–3. The currently tuned MCI 1 is displayed on the television 341. When a display channel change occurs (i.e., from a prior display channel to a current display channel), as illustrated in FIG. 4B, the user is presented with a display of the media content instance (i.e., MCI 2) sourced from the new channel, which is downloaded into tuner buffer clusters 4 and 5, again with file sharing employed between the composite buffer file and the tuner buffer file. The clusters used to store the media content of the prior display channel remain associated with the composite buffer file but not with the tuner buffer file, as illustrated by the hashed lines 406 through the clusters 1–3 of the tuner buffer file in FIG. 4B. Assignment and association of replacement clusters (not shown) to the tuner buffer file yield a continuance of normal TSB operation. Thus, a user seeking to review downloaded media content instances can go directly to the composite buffer file to review the content, as will be described below. In other embodiments, the tuner buffer file may continue to share the same clusters as the composite buffer file by retaining the association with the clusters until the tuner buffer file capacity has been reached and the write head advances to the beginning of the tuner buffer file. In some embodiments, the decision to associate the composite buffer file or not may be user configurable (via, for a non-limiting example, a user settings menu). For a non-limiting example, the user may select a threshold viewing time per media displayed media content instance that has to be attained before an association of clusters to the composite buffer file will occur.

Figure 4C:
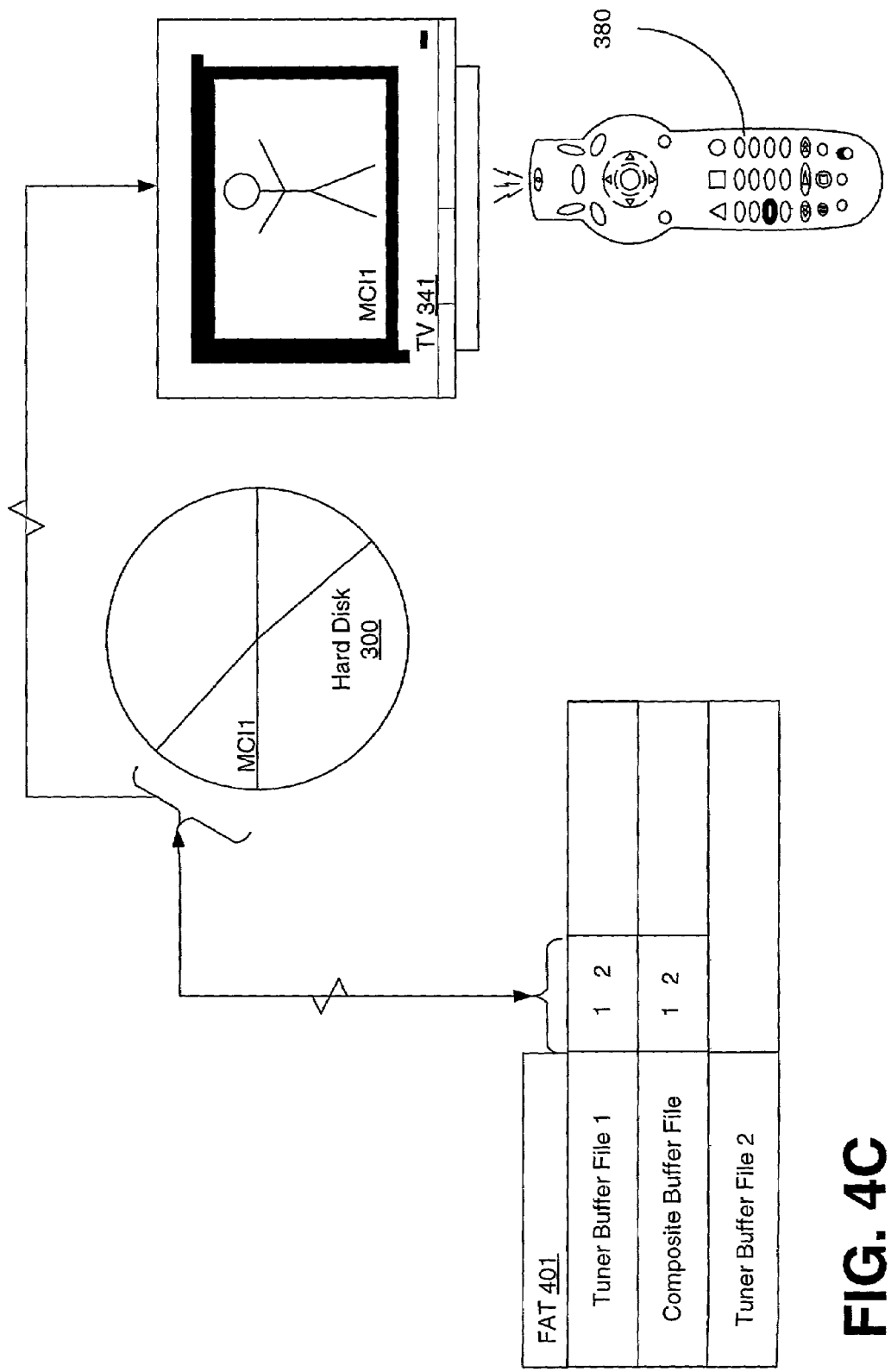
Figure 4D:
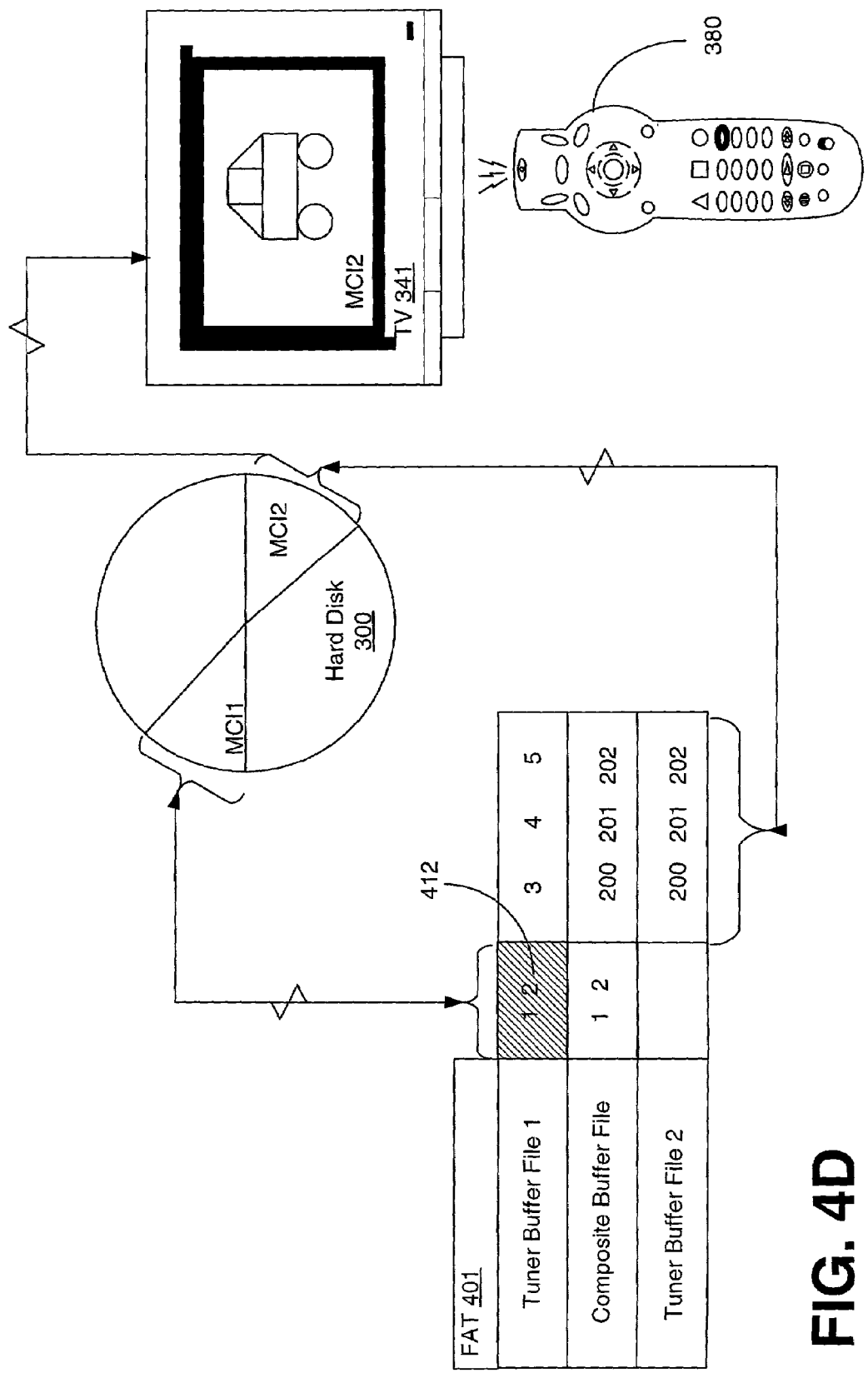

FIG. 4C is a similar schematic used to illustrate composite buffering for a multituner environment. Although a 2-tuner environment is illustrated here, it will be understood from the context of the below description that composite buffering works similarly for two or more tuners. Similar to the examples illustrated in FIGS. 4A and 4B, a partial list entry of allocated clusters (e.g., 1–2) are shown in the FAT 401. The hard disk 300, with two tuners, can be comprised of two buffer spaces, each space corresponding to the respective tuner. In this example, MCI 1 is being received into one buffer space of the hard disk 300, and stored in clusters 1–2 associated with tuner buffer file 1, as indicated by the FAT 401. The composite buffer file is also associated with these same clusters. The displayed presentation of MCI 1 is shown on the television 341. The user enters a new display channel on the remote control device 380, and the displayed presentation of MCI 2 is shown on the television 341, as illustrated in FIG. 4D. MCI 2 is sourced from the newly tuned display channel and downloaded into the corresponding buffer space (i.e., the buffer space, having clusters 200–202 associated with tuner buffer file 2). A portion of tuner buffer file 1 is dissociated from clusters 1 and 2 in one implementation, as indicated by the hashed lines 412, and MCI 2 is received into the clusters 200–202 of tuner buffer file 2. As will be described below, among other implementations, MCI 1 can continue to be downloaded to the tuner buffer file 1 clusters 3–5 while the user is viewing MCI 2. The composite buffer file is associated with the same clusters 200–202 used for downloading the media content (MCI 2) from the currently tuned display channel, as well as for the clusters 1–2, thus enabling user access to the downloaded media content from a plurality of display channels from one buffer file (i.e., the composite buffer file).

The composite buffer file is used to enable, among other functions, user access to the media content from the prior display channels, while the remaining allocated tuner buffer file clusters can receive and store the media content from the current display channel. The size of the composite buffer file (i.e., the size of the buffer space corresponding to the composite buffer file) can be maintained as substantially constant, or of variable size based on user settings selected in a system settings menu (not shown). The current display channel will include media content that will be downloaded to the remaining available clusters of the tuner buffer file (i.e., those clusters allocated for the tuner buffer file) and shared by the composite buffer file.

Figures 5A, 5B, 5C, 5D:
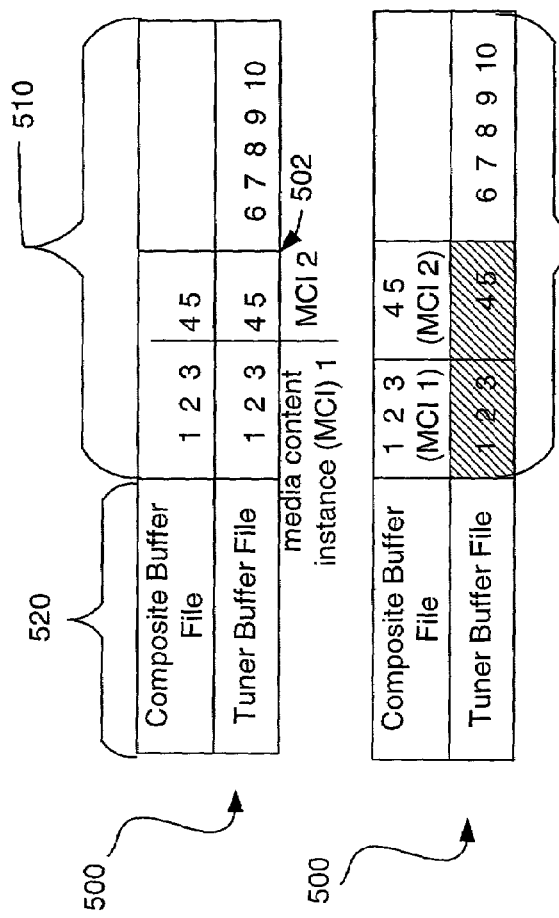
FIGS. 5A–5D are block diagrams of portion of a non-limiting example file allocation table (FAT), illustrating the file sharing and designation mechanisms for composite buffering in a single tuner implementation, in accordance with one embodiment of the invention.

FIGS. 5A–5D provide block diagram illustrations of the buffering mechanism, generally described above, for a single tuner embodiment. Portions of a FAT 500 are depicted, and include a cluster list entry 510 and a filename entry 520. It will be understood that the FAT 500 can include other elements, in one or more data structures, including the file sharing counter described above. Assume for FIGS. 5A–5D that 10 clusters have been allocated for the tuner buffer file. In some embodiments, a "reverse" mechanism can be employed whereby the clusters can initially be allocated for the composite buffer file, with associations made to the tuner buffer file in a manner similar to that described above and below. Further, it will be understood that the selection of 10 clusters is arbitrary, and fewer or greater numbers of clusters can be utilized and considered within the scope of the preferred embodiments. Returning to the non-limiting example, the composite buffer file is associated with the same clusters containing the tuner buffer file media content. Referring to FIG. 5A, clusters 1–5 of the tuner buffer file have received downloaded media content in the form of two media content instances from a first display channel. Assume the entire first media content instance (MCI 1) was stored in clusters 1–3, and only the first 15 minutes of a half-hour long presentation of a media content instance (MCI 2) were stored in clusters 4 and 5. It will herein be understood that each media content instance can be stored either in part, or in its entirety. Further, although shown delineated at cluster increments, it will herein be understood that the file sharing can be delineated within clusters (e.g., at sector delineations), or by any other data tracking mechanisms. At some point in time, depicted as channel change point 502, the user decides to change the display channel to a second display channel.

Upon changing the display channel, the clusters 1–5 (i.e., those clusters with a file sharing count of two) of the tuner buffer file that store the media content of the first display channel continue to retain MCI 1 and MCI 2, as recognized by the device driver 311 (FIG. 3A) due to the file sharing count of two and file association information. In one implementation, a portion of the tuner buffer file is dissociated from the clusters (clusters 1–5) storing MCI 1 and MCI 2, as illustrated by the cross hatching through the corresponding cluster list entry 510 of the FAT 500 of FIG. 5B. At the cluster and device driver 311 level to effect this change, this can be implemented, as one non-limiting example, by immediately providing a replacement cluster by first disassociating the tuner buffer file from the respective physical clusters wherein MCI 1 and MCI 2 are currently stored and decrementing the file sharing count for those respective clusters. This enables the composite buffer file to continued usage of the respective physical clusters that currently store MCI 1 and MCI 2. The result to the user is transparent since the tuner buffer size (e.g., the disk space size allocation of the tuner buffer, the composite buffer in other implementations, or any other TSB) is maintained by obtaining physical clusters (i.e., replacement clusters) from the cluster pool. The device driver 311 updates the FAT accordingly. Thus, the replacement clusters become ready to store new media content.

Furthermore, the wrap-around functionality of the TSB is preferably maintained by the device driver 311 (FIG. 3A) when applicable. If the first physical cluster associated with the TSB file is replaced, the device driver 311 updates the pointer from the TSB file's last physical cluster to point to the new first cluster associated with the TSB file. The new first cluster "inherits" the pointer of the prior first cluster to continue to point to the second cluster associated with the TSB file. If the last cluster in the TSB file is replaced, the device driver 311 reuses the pointer from the TSB file's prior-to-last cluster to continue pointing to the first cluster associated with the file. The pointer of the prior-to-last cluster is updated to point to the new last cluster associated with the TSB file. Likewise, wrap-around continuity is maintained when a continuous sequence of clusters associated with the TSB file are replaced, since the last cluster in the new sequence "inherits" the pointer from the last cluster in the sequence being replaced, and the pointer of the cluster preceding the first replaced cluster in the sequence replaced is updated to point to the first cluster in the new sequence of continuous clusters. A replaced sequence of continuous clusters can encompass the last and first clusters in the TSB file.

In an alternate embodiment, the TSB retains association with clusters storing MCI 1 and MCI 2 and does not attempt to perform the cluster replacement operation until a future time. As a non-limiting example, consider the implementation with clusters allocated to the tuner buffer, and the tuner buffer file and the composite buffer file associated with the tuner buffer. The device driver 311 does not effect replacement of the tuner buffer clusters until a defined time during the course of operation when it starts approaching clusters shared with the composite buffer file. This is performed by "looking ahead" from clusters currently being written to, and relative to their "logical" circular position in the wrap-around tuner buffer. At such future time, the composite buffer file may have relinquished need for the information in those respective clusters and the tuner buffer automatically repossesses the respective physical clusters with sole proprietorship (for later shared associations). However, if the composite buffer file continues to retain need for the clusters, the replacement cluster operation is performed to effect transparent continuation of the tuner buffer functionality to the user.

The amount of look-ahead time at which device driver 311 starts conducting the determination to repossess or acquire replacement clusters is predetermined empirically and programmed into the device driver 311, in one implementation, to allow sufficient time for dissociation of clusters and assignment of replacement clusters for the tuner buffer (and tuner buffer file) and therefore maintains smooth operation in the event that replacement clusters are required.

Another mechanism can be employed by which a flag (not shown) is maintained in the FAT that alerts the device driver 311 to decrement the file sharing count immediately and dissociate the initially allocated clusters of the tuner buffer file. In other implementations, the tuner buffer file is not dissociated. The composite buffer file remains associated with the clusters 1–5, resulting in access to MCI 1 and MCI 2 from the composite buffer file only. Thus the media content from the first display channel is not deleted, and the media content is accessed via the composite buffer file, according to GUI mechanisms described below.

FIG. 5C is a block diagram illustration depicting the FAT 500 after two more media content instances of the second display channel have been downloaded to the clusters (clusters 6–10) associated with the tuner buffer file. As noted, the media content is stored in the allocated clusters of the tuner buffer file. The writing continues to the next NPT value of the tuner buffer current, or live, write location. This write location can be at the first sector of a subsequent cluster (cluster 6) in the buffer space, or it can be at a different sector location within a cluster of the buffer space following the last dissociated sector (e.g., one of the remaining sectors of cluster 5). For all non-limiting examples described herein, it will be assumed that the display channel change occurred at a point in time corresponding to the location of the last sector of the last cluster depicted for storing the media content instance in progress at the time of the display channel change. As shown in FIG. 5C, the media content instances are downloaded into the buffer space associated with the tuner buffer file, and the composite buffer file is associated with the same clusters. Assume that the user entered media content instance 3 (MCI 3) at the last 15 minutes of a half-hour long presentation. Media content instance 4 (MCI 4) follows (MCI 3) on the second display channel. At some point in time during the fourth media content instance (MCI 4), say after 30 minutes of an hour long presentation of MCI 4, the user decides to change the display channel (depicted as display channel change point 504). Again, a portion of the tuner buffer file, in one implementation, is dissociated from clusters 6–10, while the clusters 6–10 remain associated with the composite buffer file, as depicted in FIG. 5D. Although two display channel changes have been illustrated, it will be understood that a fewer or greater number of display channel changes will similarly employ composite buffering as described above.

In other embodiments, composite buffering can be employed for two or more tuners and media source devices attached to the DHCT 16 via communication port 374. FIGS. 6A–6E illustrate composite buffering for a two tuner implementation, with the understanding that a greater number of tuners will follow a similar mechanism to that described for the single tuner or two tuner embodiments. In the two tuner implementation, buffer space is employed for each tuner. Also, two tuner buffer files (e.g., as shown in FIGS. 6A–6E with filenames tuner buffer file 1 and tuner buffer file 2) are used for the clusters of the two buffer spaces. A single composite buffer file is employed to share the clusters storing buffered media content with tuner buffer file 1 and tuner buffer file 2. In other embodiments, a composite buffer file can be employed for each buffer space (e.g., composite buffer file 1 and tuner buffer file 1, composite buffer file 2 and tuner buffer file 2). As illustrated in FIG. 6A, three files are shown in the file list entry 620 in the FAT 600, with the allocated clusters for each buffer space listed in the cluster list entries 610. As with FIGS. 5A–5D, only a portion of the FAT 600 of FIGS. 6A–6E will be illustrated. The three files for the non-limiting example shown in FIGS. 6A–6E include the tuner buffer file 1 associated with a first buffer space and a tuner buffer file 2 associated with a second buffer space. Also included is the composite buffer file that is associated with the clusters storing buffered media content of each tuner buffer file. Assume an initial allocation of 5 clusters for each tuner buffer file, with tuner buffer file 1 associated with clusters 1–5, and tuner buffer file 2 associated with clusters 200–204. As with the description of FIGS. 5A–5D, fewer or greater numbers of clusters can be allocated for the buffer files. Further, the initial allocation of clusters can operate in reverse, with the allocations to the composite buffer file and the associations to the tuner buffer files.

In FIG. 6A, a first media content instance (MCI 1) has been downloaded from a first display channel. MCI 1 is stored in clusters 1–2 associated with the tuner buffer file 1, and clusters 1–2 are shared by the tuner buffer file 1 and the composite buffer file. As described in the single tuner implementation, associations can, in some implementations, occur to the composite buffer file (or operate in reverse) contemporaneously with the download of media content as described above. In other implementations, associations can be made according to user configurable rules. For a non-limiting example, one rule can be that an association will not occur if the surfed channel was not displayed beyond a specified threshold duration. Another non-limiting example includes a rule that could be more preference filter related (or used in cooperation with a preference filter), such that some media content will not justify an association by the composite buffer file if the user is not interested in the subject material of the surfed media content. Assume a display channel change at point 602, which results in the FAT 600 shown in FIG. 6B.

As noted in FIG. 6B, a portion of the tuner buffer file, in one implementation, is dissociated from the clusters 1–2 storing the media content of the first display channel (this dissociation is represented by the hatching through the cluster list entry 610 for clusters 1 and 2). As described in association with a single tuner embodiment, a portion of the tuner buffer file 1 does not necessarily have to immediately be dissociated in some embodiments. Media content (MCI 2) is downloaded to the first available buffer cluster (cluster 200) of tuner buffer file 2, and cluster 200 is shared between tuner buffer file 2 and the composite buffer file. In other embodiments, instead of transferring to the clusters of tuner buffer file 2, the write operation can continue at the next available clusters of the tuner buffer file 1, as is done with the single tuner buffer implementation. In this latter case (e.g., the continued write within the allocated clusters of the tuner buffer file 1), writes to the clusters of the tuner buffer file 2 can then occur after a subsequent display channel change (i.e., subsequent to the write operations to the clusters of tuner buffer file 1) based on one or more priority rules controlling buffer space changes, or when the tuner requires a change to a different carrier frequency, among other scenarios. In still other embodiments, a portion of the tuner buffer file 1 is not immediately (i.e., after the first display channel change) dissociated, but instead, remains associated with clusters 1–2 until the tuner buffer file 1 is used to receive media content resulting from a subsequent (e.g., a second display channel change) channel change, or remains associated until the write head of the storage device 373 (FIG. 3A) advances to the start of the buffer file clusters.

Continuing with the non-limiting example from FIG. 6B, media content will be downloaded to cluster 200 and can continue to be written to clusters 201 and 202, as shown in FIG. 6C. Upon the user instigating a display channel change (point 604), a portion of the tuner buffer file 2 is dissociated from clusters 200–202 and MCI 1 and MCI 2 is accessed via the composite buffer file, as shown in FIG. 6D. Continuing the non-limiting example, as shown in FIG. 6E, media content (MCI 3) from a third display channel is downloaded to the next available cluster of the tuner buffer file 1, which is cluster 3. Further, the cluster 3 is also associated with the composite buffer file. Thus, the user, at anytime, can view the media content downloaded to a plurality of buffers using one buffer file, accessed according to graphic user interface (GUI) mechanisms described below.

FIGS. 7–9 include illustrations of some of the other embodiments described above, as well as an additional embodiment using composite buffering. FIGS. 7A and 7B are block diagram illustrations of FATs similar to that shown in FIGS. 5A and 6A, respectively, but for embodiments that use the composite buffer file for initial cluster allocations and the tuner buffer file(s) for associations to the same shared clusters (e.g., reverse operations).

FIGS. 8A–8C show a FAT similar to that shown in FIGS. 6A–6C for a two tuner implementation undergoing two display channel changes wherein a portion of the first tuner buffer file is not dissociated from the clusters storing the media content from the first display channel until after the second display channel change. FIG. 8A depicts the media content (MCI 1) being downloaded into the buffer space of tuner buffer file 1 until the display channel change 802, which results in the FAT of FIG. 8B. As shown, media content (MCI 2) from the next display channel is being downloaded into the buffer space of the tuner buffer file 2, while a portion of the tuner buffer file 1 is not yet dissociated from the clusters 1–2. Upon a display channel change 804, the tuner buffer file 1 buffer space will receive the media content (MCI 3) in the remaining buffer clusters and the first media content (MCI 1) is available only through the composite buffer file, as depicted in FIG. 8C. As described above, other embodiments include delaying the dissociation of a portion of the tuner buffer file 1 until the write head (not shown) of the storage device 373 (FIG. 3A) returns to the beginning of the buffer and the device driver 311 (FIG. 3A) seeks to replace or re-use the first buffer cluster of the tuner buffer file 1, or the user has configured (e.g. in a systems setting menu) the media content of the first display channel for permanent recording, to name a few non-limiting examples.

FIGS. 9A–9C depict another embodiment of a multi-tuner implementation, not described above, wherein one of the tuner buffer files is used for recording a non-displayed channel while the other tuner buffer file is used for the surfed channels with the composite buffer associations. As shown, the media content (MCI 1) for a first display channel is downloaded into the tuner buffer file 1 buffer space, and then a display channel change occurs 902. In other embodiments, the user may not have viewed the media content from the first display channel, but instead, for two non-limiting examples, the media content started downloading to the tuner buffer file 1 transparently due to a preference filter or due to a scheduled temporary recording configured by the user. The FAT of FIG. 9B shows that the media content of the first display channel continues to be downloaded to the tuner buffer file 1 buffer space, while the media content (MCI 2 and MCI 3) from the second display channel is downloaded to the tuner buffer file 2 buffer space, wherein the tuner buffer file 2 shares the buffer space storing that media content with the composite buffer file. A second display channel change 904 results, in one implementation, in a portion of the tuner buffer file 2 being dissociated from the clusters 200–203 (shown by the hatched lines) and the composite buffer file remaining associated with the clusters storing MCI 2 and MCI 3, as shown in FIG. 9C. Other embodiments can be implemented, as described above, such as not immediately dissociating a portion of the tuner buffer file 2, for a non-limiting example. This process will continue for multiple display channel changes according to the mechanisms already described.

Figure 9D:
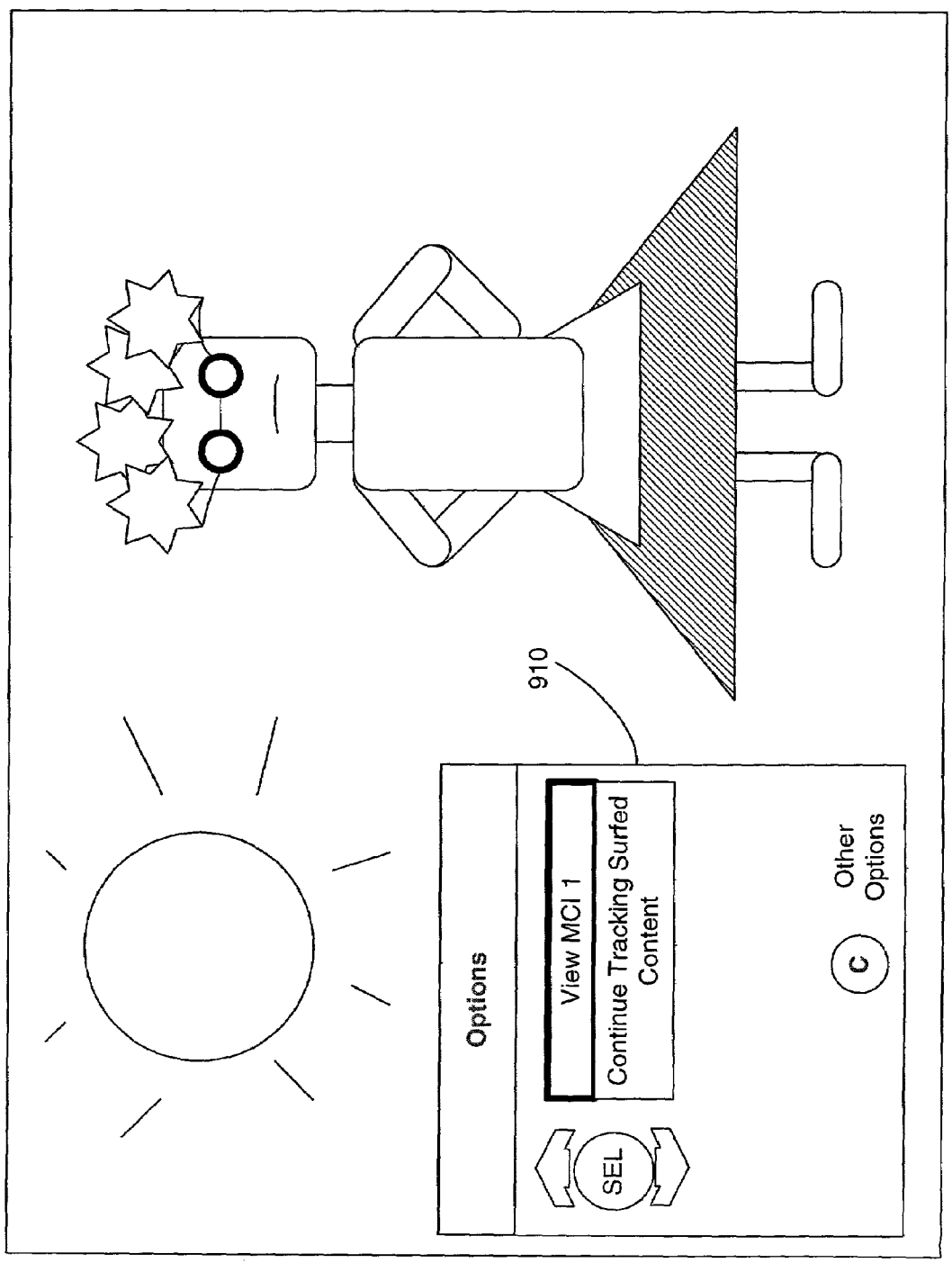
FIG. 9D is a screen diagram of a non-limiting example screen display illustrating a pop-up window, prompted by a defined condition, that enables the user to continue to view surfed media content, recorded media content from the mechanisms described in association with FIGS. 9A–9C, or other options, in accordance with one embodiment of the invention.

As the tuner buffer file 2 buffer space capacity is about to be attained, a pop-up window 910 can be displayed on the display of a currently viewed media content instance as shown in FIG. 9D. In other implementations, the user can be presented with other visual or aural messages to alert the user. As shown, the pop-up window 910 can provide the user with options that include, for a non-limiting example, choosing to view the temporarily recorded media content (stored in the clusters associated with the tuner buffer file 1 and accessible through the tuner buffer file 1) or continuing to track the surfed material (via the tuner buffer file 2 and/or the composite buffer file). Note that the pop-up window 910 may not be displayed, in some embodiments. In other embodiments, the user can invoke the pop-up window 910 by selecting a button on the remote control device 380 (FIG. 3C), or one or more of the options from the pop-up window 910 may be user selectable (and thus defaulted to) in a PVR systems settings menu. Further, the threshold that triggers the pop-up window 910 (or other actions) can include the quantity of media content (disk space used, for a non-limiting example) in either of the buffers, or elapsed time of recording, to name a few non-limiting examples.

Figure 10:
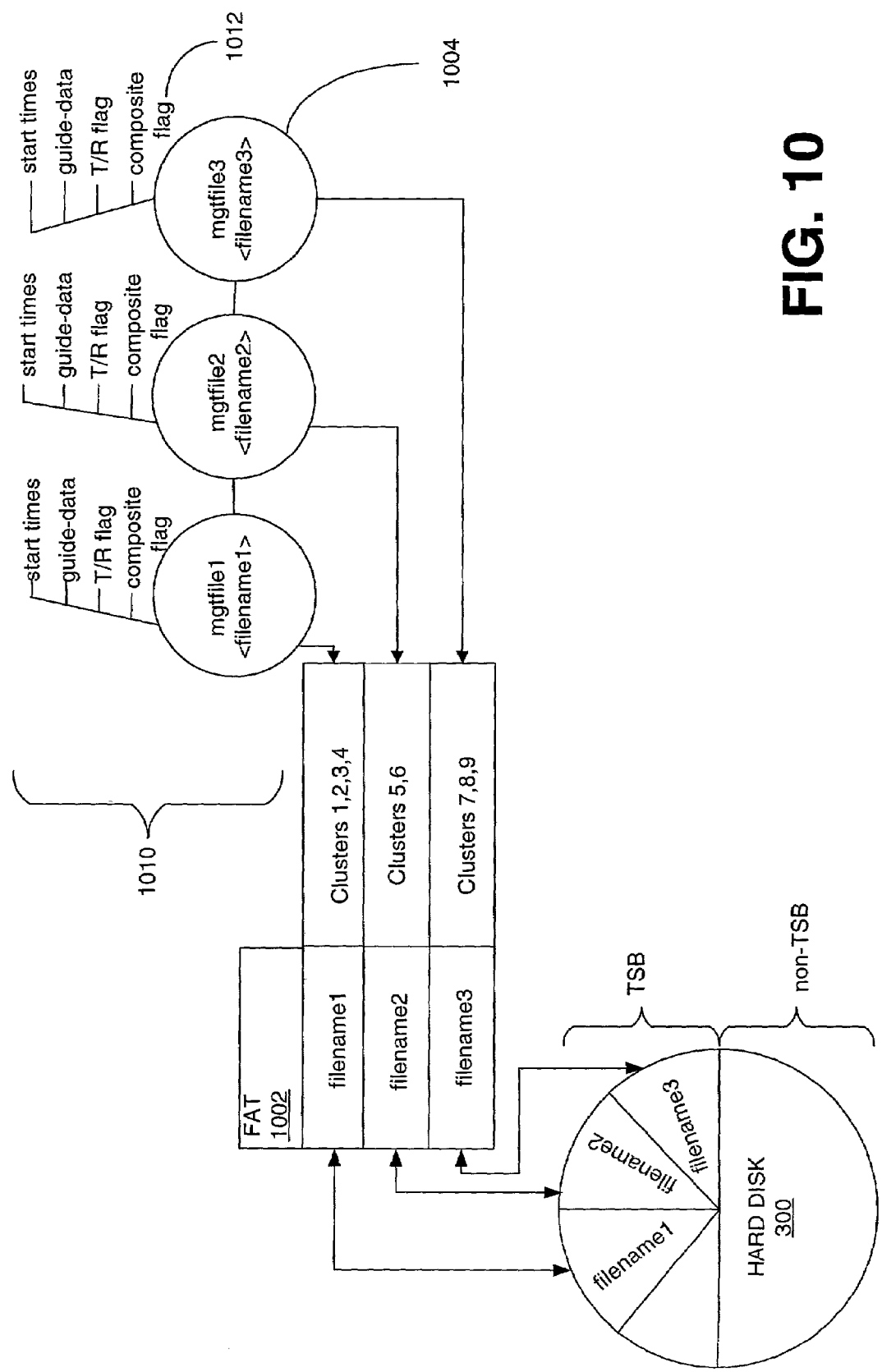
FIG. 10 is a block diagram illustration of a second buffering mechanism that can be used in cooperation with composite buffering, in accordance with one embodiment of the invention.

Another embodiment for maintaining and managing a time shift buffer is illustrated in FIG. 10, and described in more detail in the parent applications indicated above. In this embodiment, each media content instance that is received at one or more tuners of tuner system 345 (FIG. 3A) prompts the PVR application 377 (FIG. 3A) to cause each media content instance to be downloaded to the hard disk 300 and associated as a media content instance file under a media content instance filename (e.g., filename 1, filename2, etc.). This media content instance filename is recorded in a FAT 1002 that maintains a list of the corresponding clusters storing the media content instance file. The PVR application 377 also creates a management file 1004 that preferably points to the corresponding filename and includes a data record that includes, among other elements, guide data and the receipt time of the downloaded media content instance. The guide data includes the scheduled start time and stop time of the downloaded media content instance as well as other attributes and information that pertain to the media content instance. The receipt of the downloaded media content instance is also recorded by the PVR application 377 (through coordination with the operating system 353 (FIG. 3A) and an internal clock (not shown)) as a real-time value. The PVR application 377 is alerted to the start of a media content instance, in one implementation, from a keypress event (e.g., when a user tunes to a desired display channel). In another implementation, the PVR application can use polling or timing mechanisms in cooperation with the internal real-time clock and guide data. The PVR application 377 provides the operating system 353 with the scheduled stop time (from guide data, such as from an interactive program guide) of the downloaded media content instance in order to set up a timer interrupt (or in other embodiments, polls the operating system 353) with the operating system 353. The operating system 353, in coordination with a real-time clock within the DHCT 16, alerts the PVR application 377 to the end of the received media content instance.

Further, the PVR application 377 (FIG. 3A) preferably maintains all of the management files with an organization mechanism such as a linked list 1010, wherein each management file corresponds to each of the media content instances located on the hard disk 300. Read requests for a downloaded media content instance located in the TSB occurs by the PVR application 377 searching the linked list for the requested media content instance, and providing a graphics user interface (GUI) (not shown) on a display screen based on the information maintained in the corresponding management file. Furthermore, a bi-directional link-list mechanism can be employed for arbitrary entry and to search forward or backward in relation among media instances.

In relation to the composite buffering described above, similar mechanisms to those described for the lower level implementations described in FIGS. 5–9 apply. For example, in the single tuner embodiment, the management file can be structured with a composite buffer flag 1012 that is recognized by the PVR application 377 (FIG. 3A) as an alert that the filename entry of the FAT 1002 has an additional file association (i.e., the composite buffer file). This additional file association can be maintained in another data structure or data table (not shown) that functions as an association table (associating the management file with the composite buffer file and the TSB filename). Thus, user requests for access to surfed media content will be managed by the PVR application 377 searching the linked list for the corresponding composite buffer file (from the association table) pointing to the desired media content instance. The association table can be addressed via a pointer in the data record of the management file, or be integrated into the linked list 1010, among other embodiments. As with the above described implementations, display channel changes can result in the TSB filename being dissociated either immediately, on subsequent display channel changes, at write head advancement to the start of the buffer file, or otherwise. It will be appreciated, from the context of the above description, that similar mechanisms apply for multi-tuner embodiments.

The PVR application 377 (FIG. 3A) provides a graphics user interface (GUI) that assists the user in navigating to, and between, buffers and buffered media content instances. The PVR application 377 generates the GUI that includes buffer banners and progress bars (as explained below), based largely on the data maintained in a data structure maintained by the PVR application 377, as described above. In other embodiments, the controlling application (i.e., providing the real-time media content, such as CNN as provisioned by the WatchTV application 366) can include PVR functionality, such as the user interface generation. The GUI screen displays provide the user with the ability to review buffered media content from a plurality of display channels (and thus from a plurality of buffers) by navigating through one buffer file (i.e., the 114 composite buffer file).

Figure 11A:
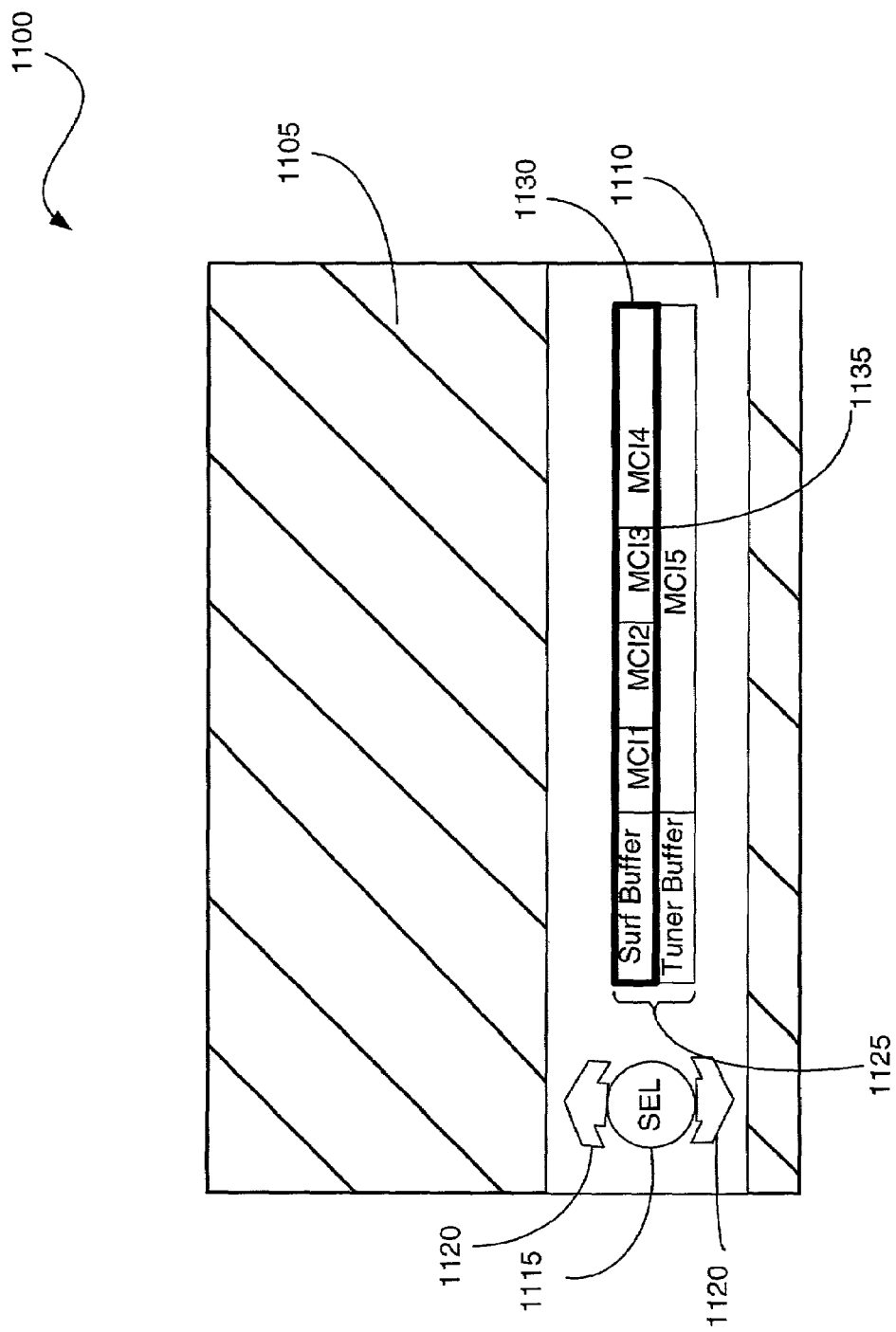
FIG. 11A is a screen diagram of a non-limiting example graphics user interface (GUI), displayed on a screen display, that is used to provide the user with the ability to view downloaded media content, in accordance with one embodiment of the invention.
Figure 11B:
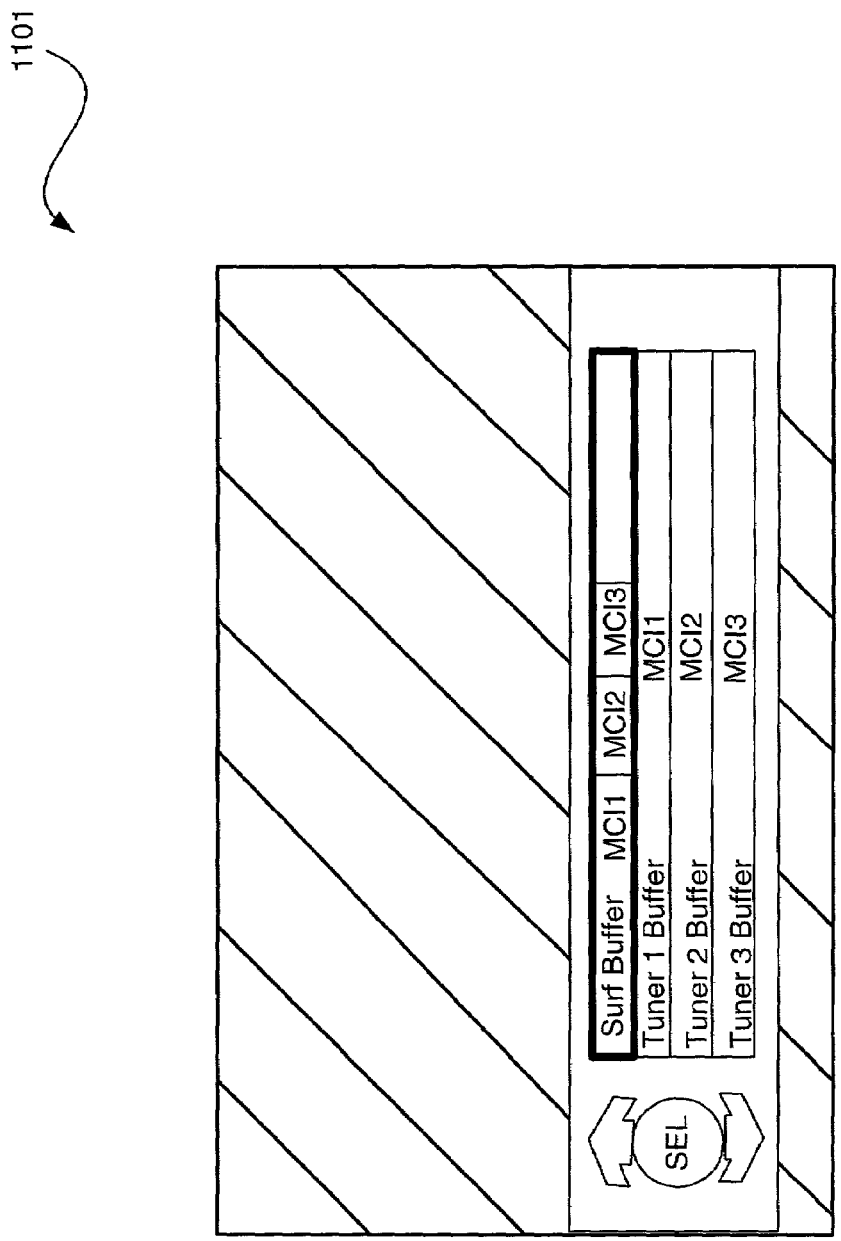
FIG. 11B is a screen diagram of a non-limiting example GUI, displayed on a screen display, that is used to provide the user with the ability to view downloaded media content in a multi-tuner system, in accordance with one embodiment of the invention.

Access to buffered media content can occur through many different implementations. FIG. 11A illustrates one non-limiting example implementation that provides for access to buffered media content, and particularly, access to media content specific, buffer progress bars. The user can be currently viewing a displayed media content instance and select the LIST button 384 (FIG. 3C) on the remote control device 380 (FIG. 3C), for a non-limiting example, and as a result of a keypress event the example GUI can be displayed as an overlay on the display of the media content instance as shown in the non-limiting example screen display 1100 of FIG. 11A. The display area 1105 will preferably default to the display of the currently tuned media content instance associated with the composite buffer file (i.e., shown as the surf buffer). The user can configure the default display in a system settings menu (not shown). The banner 1110 overlaid on the display area 1105 includes a select button icon 1115 and scroll arrow button icons 1120 that suggest a correspondence to the remote control device 380 for navigating through the option blocks 1125 and selecting a desired option (which is highlighted). For example, by selecting the tuner buffer (corresponding to the tuner buffer file), the display area 1105 will present the display of the media content instance of the tuner buffer. Note that in other embodiments, the option blocks can be labeled differently, for a non-limiting example, by a user through a systems settings menu.

Each of the option blocks 1125 includes identifiers of the contents of the identified buffer. For example, the highlighted option block 1130 includes a list of all of the surfed media content instances (for example, by media content instance title) from a plurality of display channels. The boundaries of the tuned start and end time of each media content instance is preferably delineated by a line 1135. Other mechanisms for delineating the boundaries can include using differences in shading or color or by the use of text within or outside of the option block, among others. Further, other mechanisms for presenting the identity of contents of each buffer can be implemented, including, for a non-limiting example, providing PVR entries in an IPG (much like channel entries), or providing separate banners for each buffer that can be selected using a cursor and/or defaulted to based on a systems setting selection, among others. FIG. 1B is a screen diagram of another non-limiting example user interface screen 1101 providing access to buffered media content in a system using multiple tuners (and thus multiple tuner buffers). In this non-limiting example, the user has channel surfed through three different display channels, with the media content instances (MCI 1-MCI3) buffered in the respective tuner buffer and all three instances associated with the composite buffer file (labeled surf buffer) for convenient access, in accordance with one embodiment.

Assume the user has selected to view the contents of the composite buffer file (i.e., the surfing buffer). By highlighting and selecting the corresponding option block 1130 of FIG. 11A, the user is preferably presented with a media content instance specific progress bar as shown in FIGS. 12 through 15. In other embodiments, the user can be presented with another GUI with the selected buffer banner that includes the list of downloaded media content instances, similar to the structure displayed in FIG. 11A. The user also can be presented with a navigating bar within each boundary area or near each boundary area that enables individual media content instance selections for display. Continuing with the example, assume the user is presented with the media content instance specific bar illustrated in FIG. 12.

Figure 12:
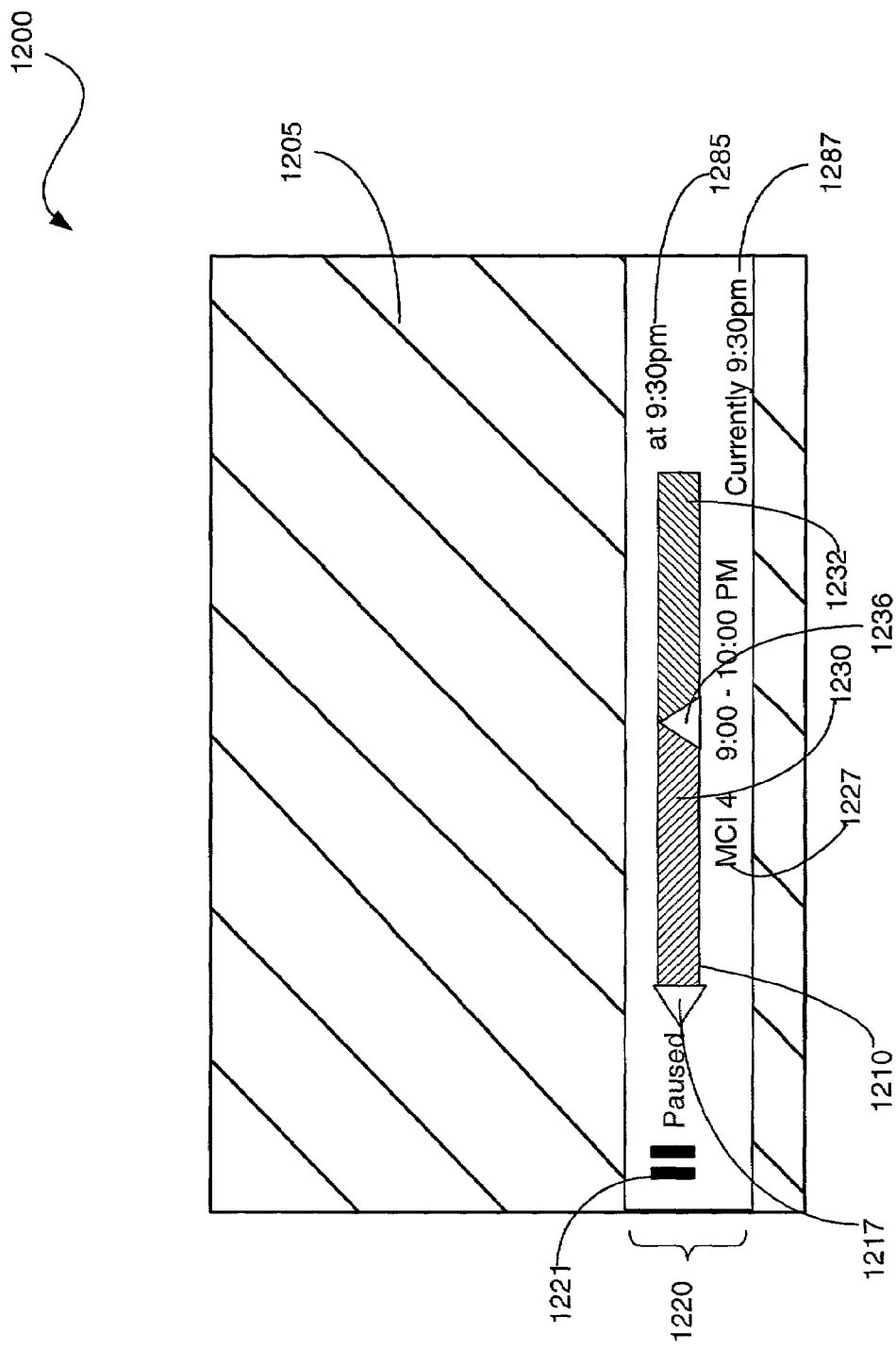
FIGS. 12–15 are screen diagrams of non-limiting example GUI screens that presents the user with media content instance specific indications of the buffered media content, in accordance with one embodiment of the invention.

FIGS. 12–15 are screen diagrams of non-limiting example GUI screens depicting a progress bar for each of the individual media content instances buffered into the buffer space described for FIG. 5A–5D. Specifically, the GUI includes a progress bar that is a representation of the user's current position in a buffered media content instance (e.g., TV show episode) relative to the currently tuned media content instance. Further information on the progress bar and its implementation can be found in the patent application entitled, "Program Position User Interface for Personal Video Recording Time Shift Buffer," Ser. No. 10/034,028, assigned to Scientific-Atlanta, filed Dec. 20, 2001, and herein incorporated by reference. Each buffered media content instance duration is represented by the progress bar preferably displayed on the bottom of the screen. Thus, the progress bar indicates the media content instance time boundaries, and is labeled with the media content instance information, as will be described below. The progress bar can also be evoked, in one implementation, by pressing the pause button 391 on the remote control device 380 (FIG. 3C), among other implementations. The progress bar will reflect the media content stored in the buffer clusters of the composite buffer file. As shown in FIG. 12, the non-limiting example screen 1200 shows that the media content instance 4 (MCI 4) was the most recent media content buffered as described in association with FIG. 5D. Recall from the description of FIG. 5D, the first 30 minutes of MCI 4 was buffered before the next display channel change. Assume a point "frozen" in time at the time of the display channel change (e.g., 9:30 PM, as reflected by current time 1287), where no other media content was buffered beyond MCI 4.

Also, assume the user had rewound to the point when MCI 4 was exited via the display channel change. A pause banner 1220 and progress bar 1210 are overlaid on top of a display 1205 of a media content instance (MCI 4). The media content instance display 1205 is depicted as closely hashed lines in the area above the pause banner 1220. The pause banner 1220 includes a pause icon 1221, and a time status 1285 indicating the time location in the buffered media content instance. The current time 1287 indicates the current time of day. The title portion 1227 indicates the title of the buffered media content instance (MCI 4) and the scheduled start time and end time (from PVR application maintained data structures) associated with the current progress bar 1210. Note that MCI 4 was an hour-long scheduled presentation from 9:00 until 10:00.

The progress bar 1210 shows progression, in terms of buffer space, through a media content instance as the viewer moves, or navigates, through it. As shown here, the progress bar 1210 is media content instance specific. That is, although having a substantially constant graphic length among displayed media content instances, portions of the progress bar 1210 and associated timing indicators provide a display that is proportional to the duration of the media content instance, as well as representative of the viewed locations within the media content instance. The progress bar 1210 in this non-limiting example illustrates a first portion 1230, a second portion 1232, and a status arrow 1236. Each of these elements can include distinguishing characteristics, for instance various hatching, shades, but preferably, include different colors and shades for each. First portion 1230 indicates what portion of the current media content instance is available for rewinding and fast forwarding. Thus first portion 1230 represents the portion of MCI 4 that is stored in the clusters of the composite buffer file. Since MCI 4 was buffered for the first 30 minutes of an hour-long presentation before the next display channel change, first portion 1230 spans from the beginning of the progress bar 1210 to approximately midway through the progress bar 1210. The second portion 1232 indicates what portion of the current media content instance is unavailable for rewinding and fast forwarding. As the user changed the display channel midway through the presentation of MCI 4, the second half of the presentation is unavailable for viewing. Status arrow 1236 indicates the currently viewed position in the buffered MCI 4, which in this non-limiting example, is the position where the user has rewinded to (thus midway on the progress bar 1210). Note that the time status 1285 also indicates the presentation position to where the user has rewound. The progress bar 1210 also includes a bar arrow 1217 on the left-hand side, representing to the user that there is additional buffered media content.

Figure 13:
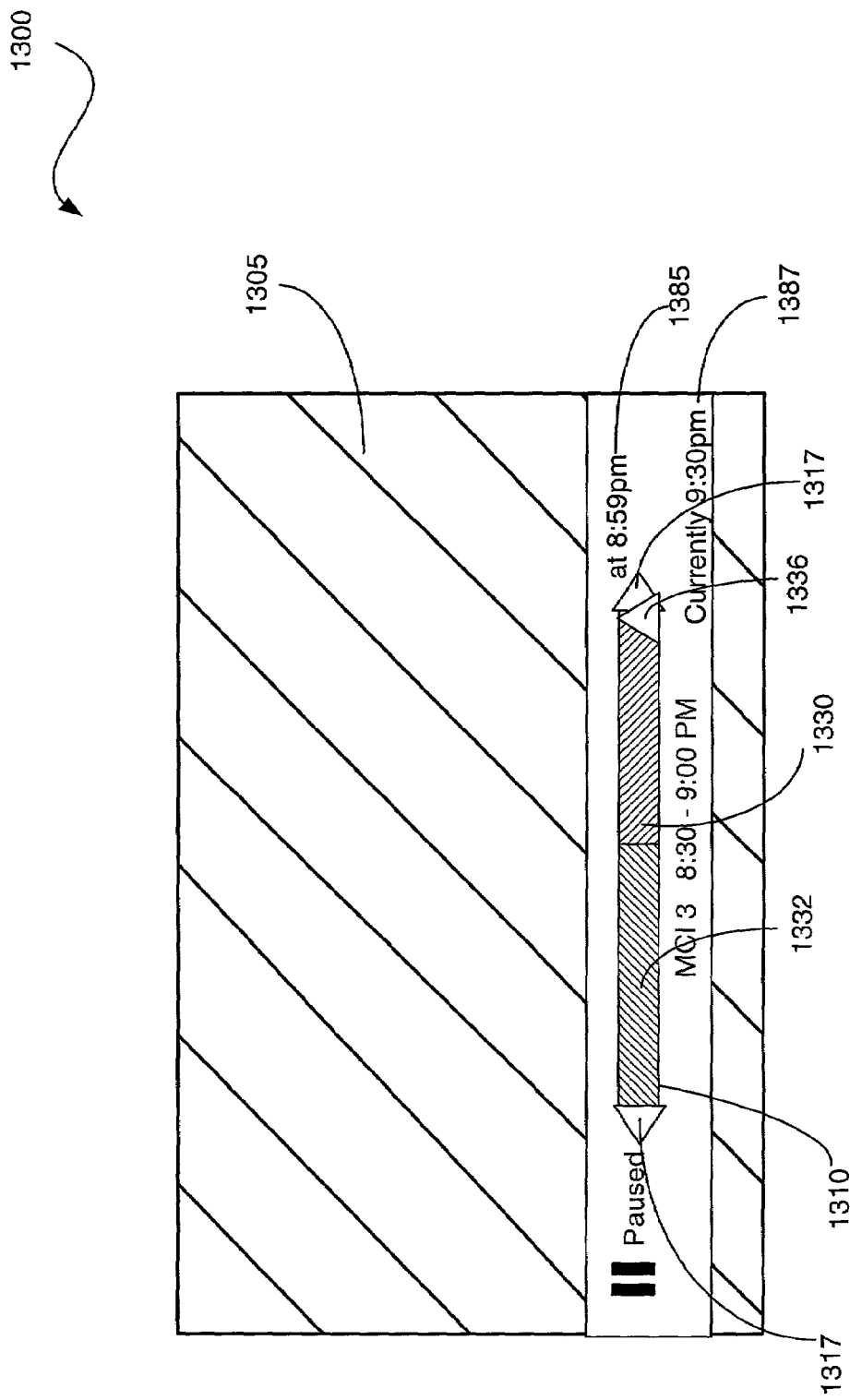

FIG. 13 is a screen diagram of a non-limiting example screen illustrating that the user has continued to rewind through the composite buffer file to the media content instance (MCI 3) buffered before MCI 4. As discussed in association with FIG. 5C, non-limiting example screen 1300 shows that MCI 3 was viewed (and thus buffered) during the last 15 minutes of a half-hour presentation. Assume the user has rewound to the 8:59 PM position or location of MCI 3. As noted, the status arrow 1336 is now located toward the end of the progress bar 1310, as also reflected by the time status 1385 (e.g., 8:59 PM). The display 1305 may be a blank screen when the user has navigated to the unavailable portion (e.g., second portion 1332), or a screen with a barker indicating to the user that this time portion of MCI 3 is unavailable for viewing, or it can be a display of the last frame of MCI 3 that was buffered. Note the boundary between the first portion 1330 and the second portion 1332, reflecting the fact that only the last half of MCI 3 was buffered and thus available from the composite buffer file. The position of first portion 1330 and second portion 1332 have reversed (e.g., when compared to the non-limiting example screen 1200, FIG. 12) according to the fact that the last 15 minutes was buffered (versus the first half in MCI 4). Further note the bar arrows 1317 on each side of the progress bar 1310, reflecting the fact that media content is available for viewing (or permanent recording) before and after MCI 3.

Figure 14:
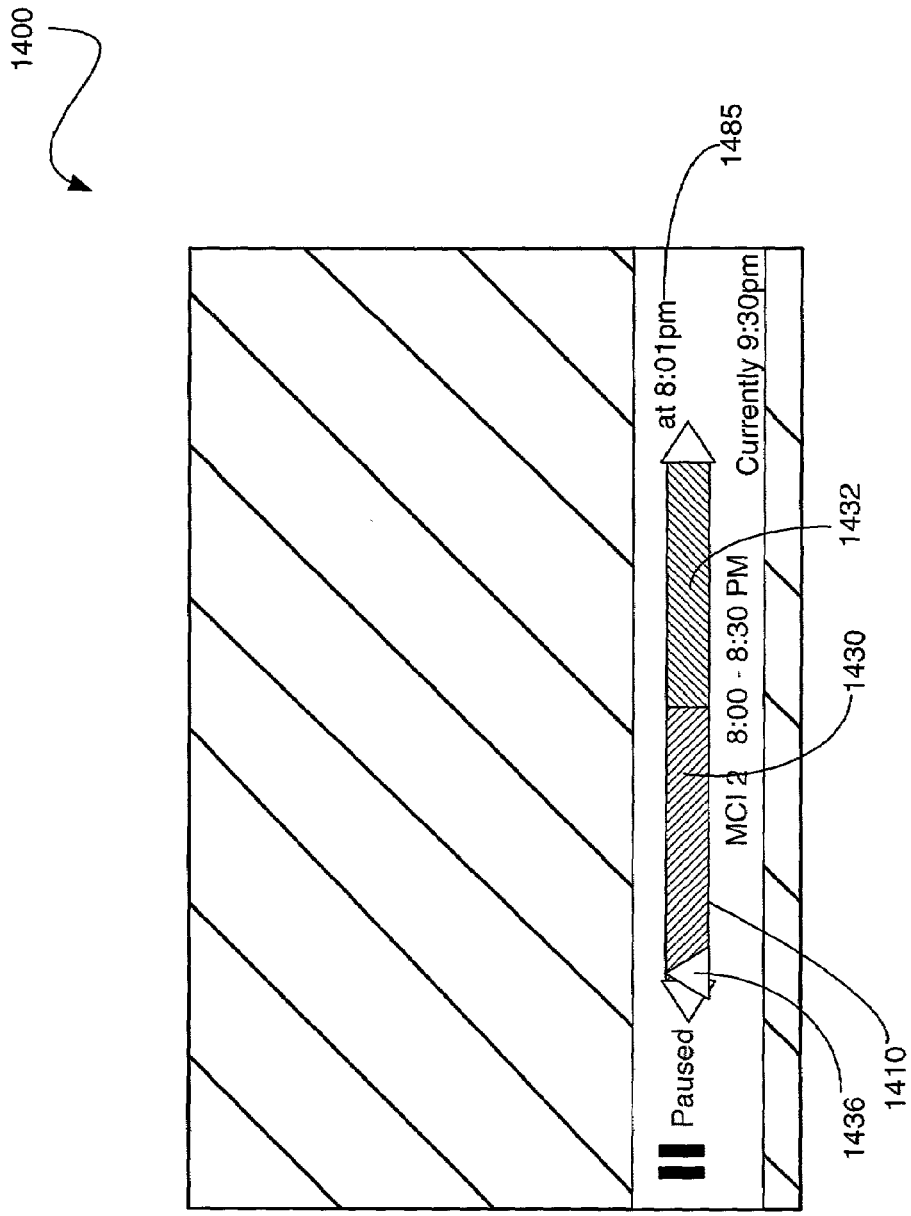

If the user continues to rewind to the buffered media content before MCI 3, he or she will be presented with the non-limiting example screen 1400 shown in FIG. 14. The user has rewound to the 8:01 PM position within MCI 2, as reflected by the time status 1485 and position of the status arrow 1436. Recall from the discussion of FIG. 5B, the first 15 minutes (of a half-hour long presentation) of the second buffered media content instance (MCI 2) was buffered. This fact is reflected by the boundary between the first portion 1430 and the second portion 1432 midway through the progress bar 1410. Also, note that the first portion 1430 is the first half of the progress bar 1410, corresponding to the fact that the first half of MCI 2 was buffered.

Figure 15:
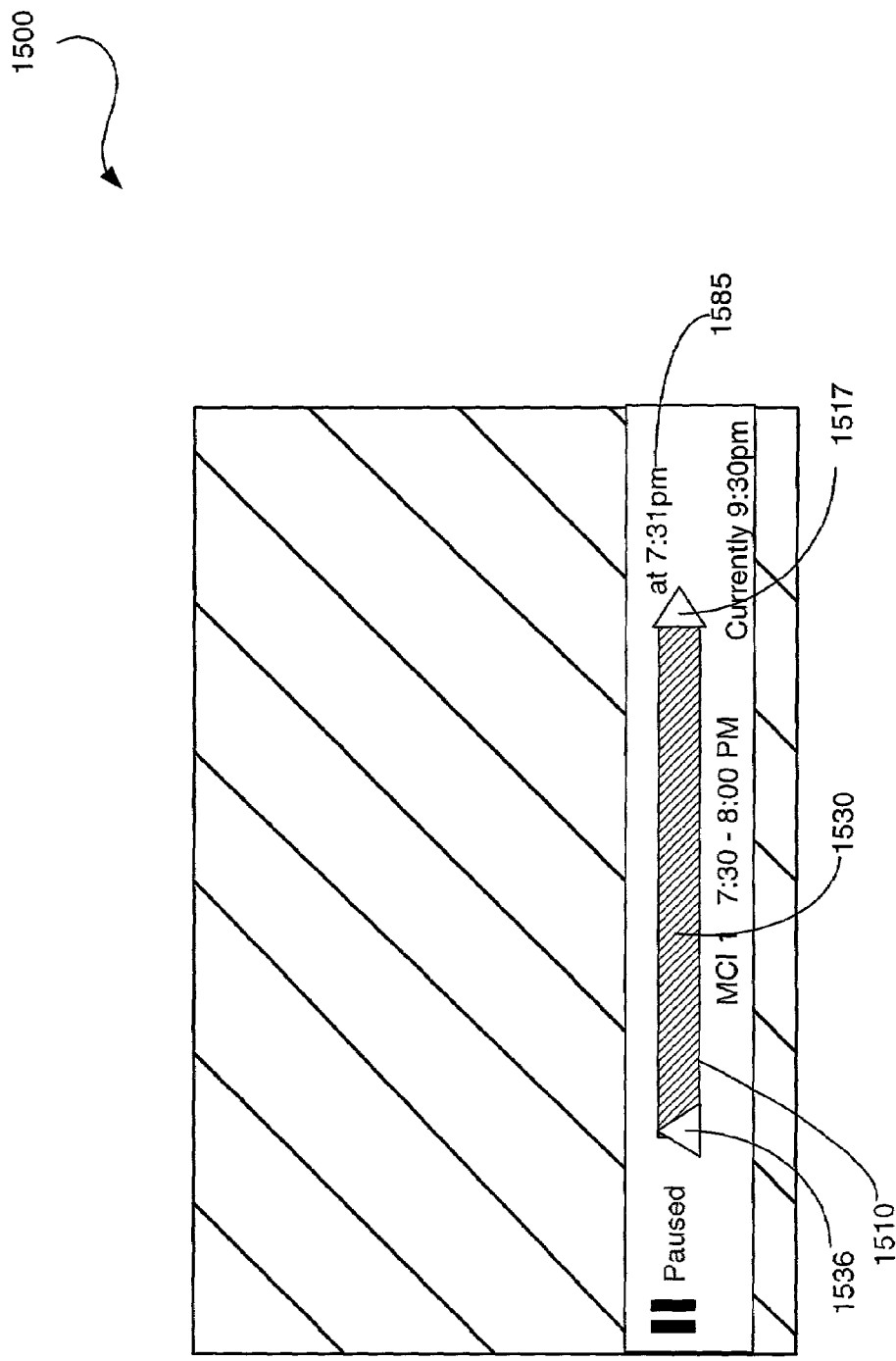

Finally, the user has decided to rewind to approximately the beginning of the first buffered media content instance (MCI 1), as illustrated in the non-limiting example screen 1500 of FIG. 15. Recall from the discussion of FIG. 5A that the entire presentation of MCI 1 was buffered into the clusters of the composite buffer file. Accordingly, the only portion presented in the progress bar 1510 is the first portion 1530. Also note that the bar arrow 1517 is only on the right hand side of the progress bar 1510, reflecting, for a non-limiting example, that the DHCT 16 (FIG. 3A) was powered-on at the start of the presentation of MCI 1.

As indicated above, the non-limiting example screens of FIGS. 12–15 correspond to the media content stored in the buffer clusters of the composite buffer file. Preferably, the user can evoke a user settings menu (not shown) at any time that offers the user the option to view the media content in the clusters of one or more tuner buffer files, or in the composite buffer file. Alternatively, the user can be presented with a GUI providing a pre-configured list (not shown) of buffered viewing choices when he or she selects the pause button (or other buttons). In this alternative implementation, the viewing choice can be presented on a GUI that provides selectable entries for viewing (e.g., composite buffer file media content, tuner buffer file 1 media content, etc). The user can rewind to any media content instance and choose to replay or permanently record, as described above. Alternatively, the user can be presented with a list (not shown) of all of the media content instances of the composite buffer file (or tuner buffer files), with additional entries that provide the user with the amount of time the user viewed the media content and the ability to permanently record, playback, or delete one or more media content instances. This list can be presented upon selecting the pause button 391 (FIG. 3C) on the remote control device 380 (FIG. 3C), or by selecting other buttons on the remote control device 380, such as the list button 384, among other mechanisms.

In some embodiments, the composite buffer file is configurable so that user can block, or exclude, certain content from being associated with and/or displayed from the composite buffer file. The block can be by rating or content, such as violence, sexual content, etc., as explicitly provided in IPG, in one embodiment. For example, if a user is channel surfing and runs into adult content or something rated that he or she wishes not to be accessible from the composite buffer file, it is excluded from being there. In one implementation, IPG data corresponding to a media instance is read via the PVR application 377 (FIG. 3A) in cooperation with the processor 344 to determine the media content instance rating and content from one or more records for that program (or media instance) in the IPG database (not shown). This rating and content information is specified in the IPG database, for instance, in attribute fields that have bits (or flags) assigned to content presence. One bit can be assigned to violence, another bit to language, etc. If a respective bit, such as the violence bit, is turned on, then that media instance includes violence. Likewise, there is another field that specifies one or more content ratings (X, R, PG–14, etc.).

In other implementations, media content can similarly be blocked out of the composite buffer file if a particular display channel is in a blocked channel list or a locked channel list as configured by parental control.

The device driver 311 (FIG. 3A) and PVR application 377 (FIG. 3A) may be implemented to provide a composite buffer file for the buffer spaces in the storage device 373, or in any memory-type device, such as RAM, DRAM, non-volatile memory, or related memory. Further, the scope of the preferred embodiment is not meant to be limited to downloads of media content through cache transfers between the storage device 373 and system memory 349, but may include direct downloads to system memory 349 alone, or to the storage device 373 alone.

The device driver 311 and the PVR application 377 can be implemented in hardware, software, firmware, or a combination thereof. In the preferred embodiment(s), the device driver 311 and the PVR application 377 are implemented in software or firmware that is stored in a memory and that is executed by a suitable instruction execution system. If implemented in hardware, as in an alternative embodiment, the device driver 311 and the PVR application 377 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The device driver 311 and the PVR application 377, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for non-limiting example but not limited to, an electronic, magnetic, optical, electromagnetic, infrared, or semiconductor system, apparatus, device, or propagation medium. More specific non-limiting examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible non-limiting examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

What is claimed is:

1. A method for managing and accessing media content corresponding to a plurality of display channels and stored in a storage device coupled to a media client device in a subscriber television system, said method comprising the steps of:
   receiving media content at the client device;
   storing the media content in a plurality of tuner buffers in the storage device;
   associating the plurality of tuner buffers with a composite buffer file;
   associating each of the tuner buffers with a corresponding tuner buffer file; and
   using the tuner buffer file for associating with the tuner buffer that is storing the currently tuned recorded media content, while using the composite buffer file for associating with the media content from a plurality of surfed display channels.

2. The method of claim 1, further comprising the steps of accessing and displaying the media content stored among the plurality of tuner buffers from the composite buffer file.

3. The method of claim 2, further comprising the step of enabling a user to select the media content from a display of media content instance titles associated with the media content stored in the plurality of tuner buffers and associated with the composite buffer file.

4. The method of claim 1, wherein the step of associating the plurality of tuner buffers with a composite buffer file comprises the step of associating the composite buffer file with the tuner buffers after a threshold is substantially attained.

5. The method of claim 4, wherein the threshold includes at least one of viewing time, storage device disk space consumed for the download of the media content, and priority as determined by a user.

6. The method of claim 1, further comprising the step of dissociating at least a portion of the tuner buffer file from the tuner buffer after an event corresponding to at least one of a first display channel change, a second display channel change, and a substantial consumption of tuner buffer capacity.

7. The method of claim 1, further comprising the step of using the plurality of tuner buffers for a plurality of tuners.

8. The method of claim 1, further comprising the step of associating the tuner buffer file with the tuner buffers after a threshold is substantially attained.

9. The method of claim 8, wherein the threshold includes at least one of viewing time, storage device disk space consumed for the download of the media content, and priority as determined by a user.

10. The method of claim 1, further comprising the step of providing a user with a user interface screen configured to enable the user to select from which of the buffer files to view the media content.

11. The method of claim 1, further comprising the step of configuring the composite buffer file to exclude the media content based on at least one of media content instance rating, media content instance content, existence in a blocked display channel list, and existence in a locked display channel list.

12. The method of claim 11, further comprising the step of reading interactive program guide data to determine the rating and the content of the media content.

13. The method of claim 1, further comprising the steps of using one of the plurality of tuner buffers for signals received from an external media source and associating the one of the tuner buffers with the composite buffer file.

14. A method for managing and accessing media content corresponding to a plurality of display channels and stored in a plurality of tuner buffers on a storage device, the storage device coupled to a media client device in a subscriber television system, said method comprising the steps of:
   associating each of the tuner buffers with a corresponding tuner buffer file;
   associating the tuner buffers with a composite buffer file;
   accessing and displaying the media content received from the plurality of display channels from the composite buffer file; and
   using the tuner buffer file for associating with the tuner buffer that is that is storing the currently tuned recorded media content, while using the composite buffer file for associating with the tuner buffer that is storing the media content received from a plurality of surfed display channels.

15. The method of claim 14, wherein the steps of accessing and displaying comprises the step of enabling a user to select the media content from a display of media content instance titles associated with the media content stored in the tuner buffers and associated with the composite buffer file.

16. The method of claim 14, wherein the step of associating the tuner buffers with a composite buffer file comprises the step of associating the composite buffer file and the tuner buffer file after a threshold is substantially attained.

17. The method of claim 14, wherein the threshold includes at least one of viewing time, storage device disk space consumed for the download of the media content, and priority as determined by a user.

18. The method of claim 14, further comprising the step of dissociating at least a portion of the tuner buffer file from the corresponding tuner buffer after an event corresponding to at least one of a first display channel change, a second display channel change, and a substantial consumption of tuner buffer capacity.

19. The method of claim 14, further comprising the step of using the tuner buffers for a plurality of tuners.

20. The method of claim 14, wherein the step of accessing and displaying comprises the step of providing a user with a user interface screen configured to enable the user to select from which of the buffer files to view the media content.

21. The method of claim 14, further comprising the step of configuring the composite buffer file to exclude the media content based on at least one of media content instance rating, media content instance content, existence in a blocked display channel list, and existence in a locked display channel list.

22. The method of claim 21, further comprising the step of reading interactive program guide data to determine the rating and the content of the media content.

23. The method of claim 14, further comprising the steps of using one of the tuner buffers for signals received from an external media source and associating the one of the tuner buffers with the composite buffer file.

24. A method for managing and accessing media content corresponding to a plurality of display channels and stored in a plurality of tuner buffers on a storage device, the storage device coupled to a media client device in a subscriber television system, said method comprising the steps of:
   using a plurality of tuner buffers for a plurality of tuners that receive media content from a plurality of display channels;
   associating each of the tuner buffers with a corresponding tuner buffer file;
   associating the plurality of tuner buffers with a composite buffer file;
   associating the composite buffer file and the tuner buffer file after a threshold is substantially attained, wherein the threshold includes at least one of viewing time, storage device disk space consumed for the download of the media content, and priority as determined by a user;
   accessing and displaying the media content received from the plurality of display channels from the composite buffer file, wherein the step of accessing further includes selecting the media content from a display of media content instance titles associated with the media content stored in the plurality of tuner buffers and associated with the composite buffer file, and accessing and displaying the media content stored in one of the tuner buffers with the corresponding tuner buffer file;
   using the tuner buffer file for associating with the tuner buffer that is storing the currently tuned recorded media content, while using the composite buffer file for associating with the tuner buffer that is storing the media content received from a plurality of surfed display channels;
   configuring the composite buffer file to exclude the media content based on at least one of media content instance rating, media content instance content, existence in a blocked display channel list, and existence in a locked display channel list;
   reading interactive program guide data to determine the rating and the content of the media content;
   using one of the plurality of tuner buffers for signals received from an external media source and associating the one of the tuner buffers with the composite buffer file; and
   providing a user with a user interface screen configured to enable the user to select from which of the buffer files to view the media content.

25. A system for managing and accessing media content corresponding to a plurality of display channels and stored in a plurality of tuner buffers on a storage device, the storage device coupled to a media client device in a subscriber television system, said system comprising:
   a memory with logic; and
   a processor configured with the logic to associate the plurality of tuner buffers with a composite buffer file, wherein the processor is further configured with the logic to associate each of the tuner buffers with a corresponding tuner buffer file, wherein the processor is further configured with the logic to use the tuner buffer file for associating with the tuner buffer that is storing the currently tuned recorded media content, while use the composite buffer file for associating with the media content received from a plurality of surfed display channels.

26. The system of claim 25, wherein the processor is further configured with the logic to access and display the media content stored among the plurality of tuner buffers from the composite buffer file.

27. The system of claim 26, wherein the processor is further configured with the logic to enable a user to select the media content from a display of media content instance titles associated with the media content stored in the plurality of tuner buffers and associated with the composite buffer file.

28. The system of claim 25, wherein the processor is further configured with the logic to associate the composite buffer file with the tuner buffers after a threshold is substantially attained.

29. The system of claim 28, wherein the threshold includes at least one of viewing time, storage device disk space consumed for the download of the media content, and priority as determined by a user.

30. The system of claim 25, wherein the processor is further configured with the logic to dissociate at least a portion of the tuner buffer file from the tuner buffer after an event corresponding to at least one of a first display channel change, a second display channel change, and a substantial consumption of tuner buffer capacity.

31. The system of claim 25, wherein the processor is further configured with the logic to use the plurality of tuner buffers for a plurality of tuners.

32. The system of claim 25, wherein the processor is further configured with the logic to associate the tuner buffer file with the tuner buffers after a threshold is substantially attained.

33. The system of claim 32, wherein the threshold includes at least one of viewing time, storage device disk space consumed for the download of the media content, and priority as determined by a user.

34. The system of claim 25, wherein the processor is further configured with the logic to provide a user with a user interface screen configured to enable the user to select from which of the buffer files to view the media content.

35. The system of claim 25, wherein the processor is further configured with the logic to configure the composite buffer file to exclude media content based on at least one of media content instance rating, media content instance content, existence in a blocked display channel list, and existence in a locked display channel list.

36. The system of claim 35, wherein the processor is further configured with the logic to read interactive program guide data to determine the rating and the content of the media content.

37. The system of claim 25, wherein the processor is further configured with the logic to use one of the plurality of tuner buffers for signals received from an external media source and associating the one of the tuner buffers with the composite buffer file.

38. A system for managing and accessing media content corresponding to a plurality of display channels and stored in a plurality of tuner buffers on a storage device, the storage device coupled to a media client device in a subscriber television system, said system comprising:

a memory with logic; and
a processor configured with the logic to associate each of the tuner buffers with a corresponding tuner buffer file, wherein the processor is further configured with the logic to associate the tuner buffers with a composite buffer file, wherein the processor is further configured with the logic to access and display the media content received from the plurality of display channels from the composite buffer file, wherein the processor is further configured with the logic to use the tuner buffer file for associating with the tuner buffer that is storing currently tuned recorded media content, and use the composite buffer file for associating with the media content received from a plurality of surfed display channels.

39. The system of claim 38, wherein the processor is further configured with the logic to enable the user to select the media content from a display of media content instance titles associated with the media content stored in the tuner buffers and associated with the composite buffer file.

40. The system of claim 38, wherein the processor is further configured with the logic to associate the composite buffer file and the tuner buffer file after a threshold is substantially attained.

41. The system of claim 40, wherein the threshold includes at least one of viewing time, storage device disk space consumed for the download of the media content, and priority as determined by a user.

42. The system of claim 38, wherein the processor is further configured with the logic to dissociate at least a portion of the tuner buffer file from the corresponding tuner buffer after an event corresponding to at least one of a first display channel change, a second display channel change, and a substantial consumption of tuner buffer capacity.

43. The system of claim 38, wherein the processor is further configured with the logic to use the plurality of the tuner buffers for a plurality of tuners.

44. The system of claim 38, wherein the processor is further configured with the logic to provide a user with a user interface screen configured to enable the user to select from which of the buffer files to view the media content.

45. The system of claim 38, wherein the processor is further configured with the logic to configure the composite buffer file to exclude media content based on at least one of media content instance rating, media content instance content, existence in a blocked display channel list, and existence in a locked display channel list.

46. The system of claim 45, wherein the processor is further configured with the logic to read interactive program guide data to determine the rating and the content of the media content.

47. The system of claim 38, wherein the processor is further configured with the logic to use one of the plurality of tuner buffers for signals received from an external media source and associating the one of the tuner buffers with the composite buffer file.

48. A system for managing and accessing media content corresponding to a plurality of display channels and stored in a plurality of tuner buffers on a storage device, the storage device coupled to a media client device in a subscriber television system, said system comprising:

a memory with logic; and
a processor configured with the logic to use a plurality of tuner buffers for a plurality of tuners that receive media content from a plurality of display channels, wherein the processor is further configured with the logic to associate each of the tuner buffers with a corresponding tuner buffer file, wherein the processor is further configured with the logic to associate the plurality of tuner buffers with a composite buffer file, wherein the processor is further configured with the logic to associate the composite buffer file and the tuner buffer file after a threshold is substantially attained, wherein the threshold includes at least one of viewing time, storage device disk space consumed for the download of the media content, and priority as determined by a user, wherein the processor is further configured with the logic to access and display the media content received from the plurality of display channels from the composite buffer file, wherein the processor is further configured with the logic to select the media content from a display of media content instance titles associated with the media content stored in the plurality of tuner buffers and associated with the composite buffer file, and access and display the media content stored in one of the tuner buffers with the corresponding tuner buffer file, wherein the processor is further configured with the logic to use the tuner buffer file for associating with the tuner buffer that is storing currently tuned recorded media content, while using the composite buffer file for associating with the tuner buffer that is storing the media content received from a plurality of surfed display channels, wherein the processor is further configured with the logic to dissociate at least a portion of the tuner buffer file from the corresponding tuner buffer after an event corresponding to at least one of a first display channel change, a second display channel change, and a substantial consumption of tuner buffer capacity, wherein the processor is further configured with the logic to provide a user with a user interface screen configured to enable the user to select from which of the buffer files to view the media content, wherein the processor is further configured with the logic to configure the composite buffer file to exclude media content based on at least one of media content instance rating, media content instance content, existence in a blocked display channel list, and existence in a locked display channel list, wherein the processor is further configured with the logic to read interactive program guide data to determine the rating and the content of the media content, wherein the processor is further configured with the logic to use one of the plurality of tuner buffers for signals received from an external media source and associating the one of the tuner buffers with the composite buffer file.

* * * * *